United States Patent
Jha et al.

(10) Patent No.: US 10,921,873 B2
(45) Date of Patent: Feb. 16, 2021

(54) METHOD FOR DISPLAYING CONTENT AND ELECTRONIC DEVICE THEREOF

(71) Applicant: Samsung Electronics Co., Ltd., Suwon-si (KR)

(72) Inventors: Krishna Kishor Jha, Bangalore (IN); Dibyadarshi Debadas, Bangalore (IN); Ashish Kumar Singh, Bangalore (IN); Mahammadrafi Raimansab Maniyar, Bangalore (IN); Raghu Ballappa Bankapur, Bangalore (IN); Vaisakh Punnekkattu Chirayil Sudheesh Babu, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 12 days.

(21) Appl. No.: 16/101,809

(22) Filed: Aug. 13, 2018

(65) Prior Publication Data
US 2019/0050045 A1 Feb. 14, 2019

(30) Foreign Application Priority Data

Aug. 14, 2017 (IN) .............................. 201741028925
Jul. 26, 2018 (IN) .............................. 201741028925

(51) Int. Cl.
*G06F 1/3234* (2019.01)
*G06F 1/3293* (2019.01)
(Continued)

(52) U.S. Cl.
CPC .......... *G06F 1/3265* (2013.01); *G06F 1/3262* (2013.01); *G06F 1/3293* (2013.01);
(Continued)

(58) Field of Classification Search
CPC .............. G06F 1/3265; G06F 3/04166; G06F 3/041661; G06F 1/3262; G06F 1/3293; G06F 3/041; G06F 3/0488; G06F 3/04883
See application file for complete search history.

(56) References Cited

U.S. PATENT DOCUMENTS

| 8,706,911 | B2 | 4/2014 | You et al. |
| 9,158,372 | B2 | 10/2015 | Lombardi et al. |
| (Continued) | | | |

FOREIGN PATENT DOCUMENTS

| CN | 101667100 B | 12/2011 |
| CN | 102455823 A | 5/2012 |
| (Continued) | | |

OTHER PUBLICATIONS

International Searech Report dated Dec. 26, 2018, issued in International Patent Application No. PCT/KR2018/009269.
(Continued)

*Primary Examiner* — Sejoon Ahn
(74) *Attorney, Agent, or Firm* — Jefferson IP Law, LLP

(57) ABSTRACT

A method and system for displaying content on an electronic device are provided. The method includes receiving content to be displayed on a low power display (LPD). Further, the method includes identifying at least one characteristic of the content to be displayed on a low power display (LPD) of the electronic device. Based on the at least one characteristic of the content, the method includes determining compatibility of at least one portion of the content with the LPD. Further, based on the results of the compatibility check, the method includes transforming and displaying the at least one portion of the content on the LPD based on whether the at least one portion of the content is compatible with the LPD. Further,
(Continued)

the method includes displaying the at least one portion of the content on the LPD with enabled low power touch (LPT).

20 Claims, 29 Drawing Sheets

(51) Int. Cl.
  *G06F 3/0488* (2013.01)
  *G06F 3/041* (2006.01)
(52) U.S. Cl.
  CPC ............ *G06F 3/041* (2013.01); *G06F 3/0488* (2013.01); *G06F 3/04166* (2019.05); *G06F 3/04883* (2013.01); *G06F 3/041661* (2019.05)

(56) References Cited

U.S. PATENT DOCUMENTS

| | | | | |
|---|---|---|---|---|
| 10,007,381 | B2* | 6/2018 | Seen | G02B 6/0031 |
| 10,007,860 | B1* | 6/2018 | Fotland | G06K 9/3233 |
| 10,019,654 | B1* | 7/2018 | Pisoni | G06K 9/3241 |
| 10,093,277 | B2* | 10/2018 | Shin | E05F 15/76 |
| 10,209,766 | B2 | 2/2019 | Han et al. | |
| 10,229,672 | B1* | 3/2019 | Rao | G10L 15/187 |
| 10,283,120 | B2* | 5/2019 | Gilbert | G10L 13/04 |
| 10,504,481 | B2* | 12/2019 | Kim | G09G 5/006 |
| 2009/0115757 | A1 | 5/2009 | Bae | |
| 2010/0091029 | A1 | 4/2010 | Han et al. | |
| 2012/0127124 | A1 | 5/2012 | Zanone et al. | |
| 2013/0222323 | A1* | 8/2013 | Mckenzie | G06F 1/3265 345/174 |
| 2014/0038557 | A1* | 2/2014 | Kim | G06F 21/32 455/411 |
| 2014/0201681 | A1 | 7/2014 | Mahaffey et al. | |
| 2014/0347302 | A1 | 11/2014 | Li et al. | |
| 2015/0042571 | A1 | 2/2015 | Lombardi et al. | |
| 2015/0062143 | A1 | 3/2015 | Jang et al. | |
| 2015/0082255 | A1 | 3/2015 | Devries et al. | |
| 2015/0082446 | A1 | 3/2015 | Flowers et al. | |
| 2015/0185811 | A1 | 7/2015 | Connell et al. | |
| 2015/0185815 | A1 | 7/2015 | Debates et al. | |
| 2016/0378195 | A1* | 12/2016 | Lefebvre | G06K 9/00879 382/156 |
| 2017/0108235 | A1* | 4/2017 | Guan | G05B 19/042 |
| 2018/0129512 | A1* | 5/2018 | Singh | G06F 3/0483 |
| 2018/0336645 | A1* | 11/2018 | Price | H04L 51/32 |
| 2019/0251858 | A1* | 8/2019 | Baharav | G16H 20/00 |

FOREIGN PATENT DOCUMENTS

| | | |
|---|---|---|
| CN | 105388988 A | 3/2016 |
| EP | 2 933 718 A1 | 10/2015 |
| EP | 3 376 342 A1 | 9/2018 |
| JP | 2014077993 A | 5/2014 |
| KR | 10-2010-0040441 A | 4/2010 |
| KR | 101341780 B1 | 1/2014 |

OTHER PUBLICATIONS

Written Opinion dated Dec. 26, 2018, issued in International Patent Application No. PCT/KR2018/009269.
Extended European Search Report dated May 29, 2020, issued in European Patent Application No. 18847049.6-1203.
Indian Office Action dated Sep. 11, 2020, issued in Indian Application No. 201741028925.
Chinese Office Action dated Sep. 28, 2020, issued in Chinese Application No. 201880052911.5.

* cited by examiner

METHOD FOR DISPLAYING CONTENT AND ELECTRONIC DEVICE THEREOF

CROSS REFERENCE TO RELATED APPLICATION(S)

This application is based on and claims priority under 35 U.S.C. § 119(a) of an Indian provisional application number 201741028925, filed on Aug. 14, 2017 and Indian complete application number 201741028925, filed on Jul. 26, 2018, filed in the Indian Intellectual Property Office, the disclosures of which are incorporated by reference herein in their entirety.

BACKGROUND

1. Field

The disclosure relates to displaying content in electronic devices. More particularly, the disclosure relates to classifying and adapting content that is displayed on an electronic device.

2. Description of Related Art

Currently, electronic devices provide a low power display mode referred to as always on display (AOD). In the AOD mode, power consumption of the display can be reduced. However, in existing scenarios, only pre-defined applications or widgets can be compatible with the AOD mode. For example, navigation applications, comprehensive always on content, always on user controls such as widgets, television (TV)/internet of things (IoT) remote and so on may not be compatible with the AOD mode. Further, a display rate (i.e., frames per second (FPS)), color depth and brightness can be reduced while displaying incompatible content on the AOD.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide methods and systems for displaying content on a low power display of an electronic device, wherein the electronic device supports at least one low power mode setting.

Another aspect of the disclosure is to provide a method for displaying content on an electronic device that supports at least one low power display mode. The method includes identifying at least one characteristic of the content to be displayed on a low power display (LPD) of the electronic device, determining compatibility of at least one portion of the content with the LPD based on the at least one characteristic of the content, and transforming and displaying the at least one portion of the content on the LPD based on whether the at least one portion of the content is compatible with the LPD.

Additional aspects will be set forth in part in the description which follows and, in part, will be apparent from the description, or may be learned by practice of the presented embodiments.

In accordance with an aspect of the disclosure an electronic device is provided. The electronic device includes a low power content integration (LPCI) engine for displaying content on an electronic device, wherein the electronic device supports at least one low power mode setting. The LPCI engine includes a reception unit configured to receive content to be displayed on a low power display (LPD) of the electronic device. Further, the LPCI engine includes a characteristics determination unit configured to determine at least one characteristic of the content. Further, the LPCI engine includes a compatibility checking unit configured to perform compatibility of at least one portion of the content with the LPD. The compatibility check is performed based on the at least one characteristic of the content. Further, the LPCI engine includes an adaption unit configured to transform and place the at least one portion of the content on the LPD when the at least one portion of the content is compatible with the LPD.

Other aspects, advantages, and salient features of the disclosure will become apparent to those skilled in the art from the following detailed description, which taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1A:
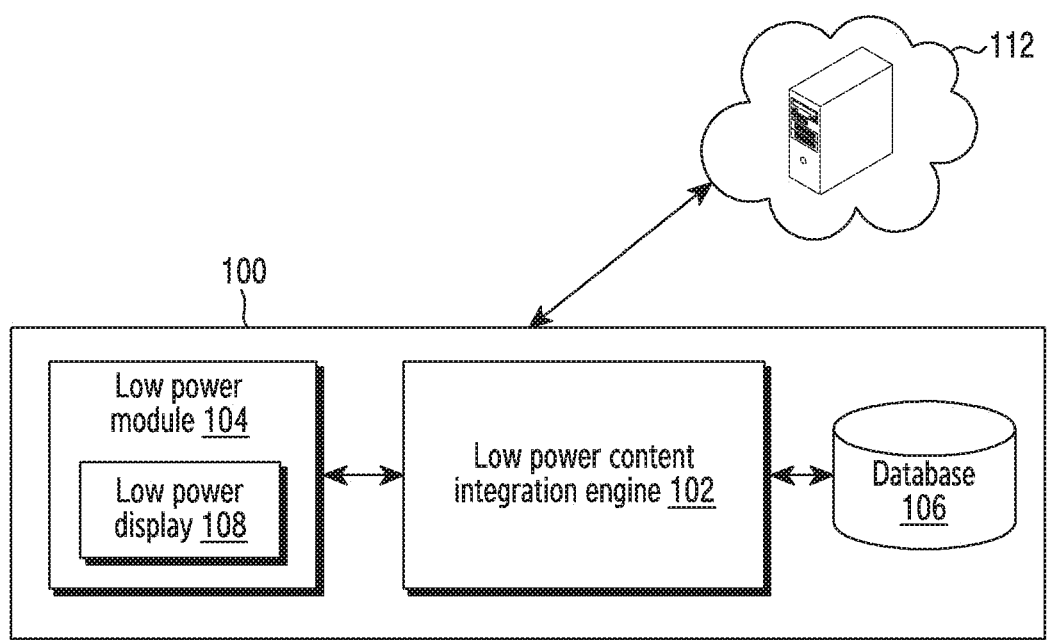
FIGS. 1A and 1B illustrate an example electronic device comprising of a low power content integration (LPCI) engine for displaying content on a low power display (LPD) with enabled low power touch (LPT) according to various embodiments of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The embodiments herein disclose methods and systems for displaying content on an electronic device.

A method disclosed herein includes receiving the content to be displayed on a low power display (LPD) of the electronic device. Further, the method includes determining one or more characteristics of the content. Further, the method performs compatibility check to determine compatibility of at least one portion of the content with the LPD. The compatibility check can be performed based on the one or more characteristics of the content. Depending on the results of the compatibility check, the method includes performing one or more actions on the at least one portion of the content for placing the at least one portion of the content on the LPD. In an embodiment, the method includes displaying the at least one portion on the LPD with low power touch (LPT) enabled.

Referring now to the drawings, and more particularly to FIGS. 1 through 18, where similar reference characters denote corresponding features consistently throughout the figures, there are shown example embodiments.

Figure 1B:
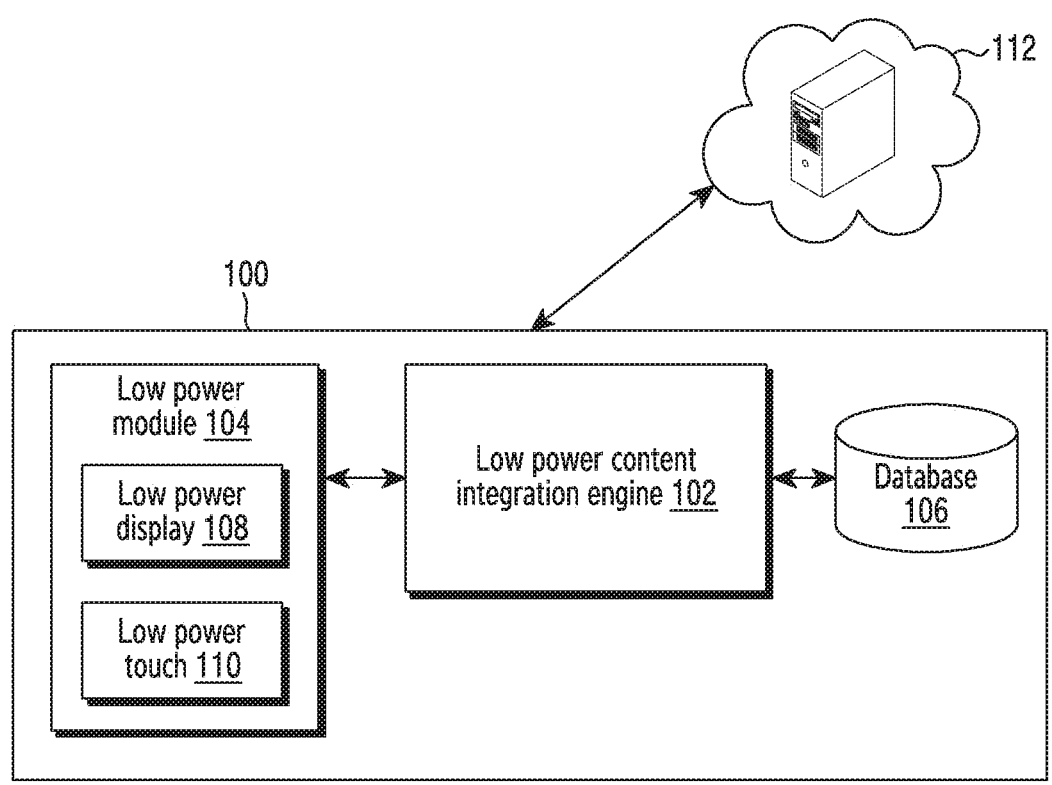

FIGS. 1A and 1B illustrate an example electronic device comprising of a low power content integration (LPCI) engine for displaying content on a low power display (LPD) according to embodiments as disclosed herein.

Referring to FIG. 1A, an example electronic device 100 can be, but is not limited to, a mobile phone, a smartphone, tablet, a phablet, a personal digital assistant (PDA), a laptop, a computer, a wearable device, an Internet of Things (IoT) device, a vehicle infotainment system, a medical device, a television (TV) or any other device which supports low power display mode settings.

The electronic device 100 includes the LPCI engine 102, a low power module 104 and a database 106. The low power module 104 may include a low power display 108. Embodiments herein use the terms LPD), low power mode screen, and always on display (AOD), to refer to a display in the electronic device 100, wherein the display can use low power display mode settings, while being always on.

Referring to FIG. 1B, the low power module 104 of the electronic device 100 may include a low power display 108 and a low power touch 110. Embodiments herein use the terms LPT and always on touch (AOT) interchangeably to enable a user to have minimal interaction with the content displayed on the LPD 108.

Referring to FIG. 1A, the LPCI engine 102 can be configured to display the content on the LPD 108 of the electronic device 100. In an embodiment, the LPCI engine 102 can be configured to display the content on the LPD 108 with LPT enabled, as illustrated in FIG. 1B. The content can be, but is not limited to, text, a user control/widget, a document, an application (such as, but not limited to, a navigation application/map, a calendar application, a gaming application, a health and fitness application, a weather application, a remote application for a TV or another appliance, a camera application and so on), an icon, media (an image, a video, an animation and so on), a barcode, a quick response (QR) code and so on.

In order to integrate the content in to the low power mode operation, the LPCI engine 102 receives the content and determines characteristics of the content. Based on the characteristics of the content, the LPCI engine 102 performs a compatibility check to classify at least one portion of the content which is compatible with the LPD 108. Further, the LPCI engine 102 transforms the at least one portion of the content based on the result of the compatibility check. Further, the LPCI engine 102 places the at least one portion of the content on the LPD 108 when the at least one portion of the content is compatible with the LPD 108. In an embodiment, the LPCI engine 102 performs the compatibility check to classify at least one portion of the content which can be compatible with the LPT. Further, the LPCI engine 102 performs actions on the determined portions of the content to display the portions of the content on the LPD 108 with LPT 110 enabled.

In an embodiment, the LPCI engine 102 may receive information about policies or recommendations from a cloud server 112 for performing the actions on the determined portions of the content. Further, the LPCI engine 102 stores the results of the compatibility check and the actions performed on the content in a database 106.

In an embodiment, the LPCI engine 102 transfers the content from a normal mode to the LPD 108 and from the LPD 108 to the normal mode based on an input received from the user. The input received from the user can be, but is not limited to, a voice command, a gesture performed using stylus pen, a touch gesture (tap, click, press, swipe, hold, drag and so on), an input initiated using an edge display supporting an edge display, an input initiated using a bendable display, a camera and AOT gesture, data received from sensors (proximity sensors, Hall effect sensors and so on), an input initiated using augmented reality (AR)/virtual reality (VR) techniques, and so on.

Figure 2:
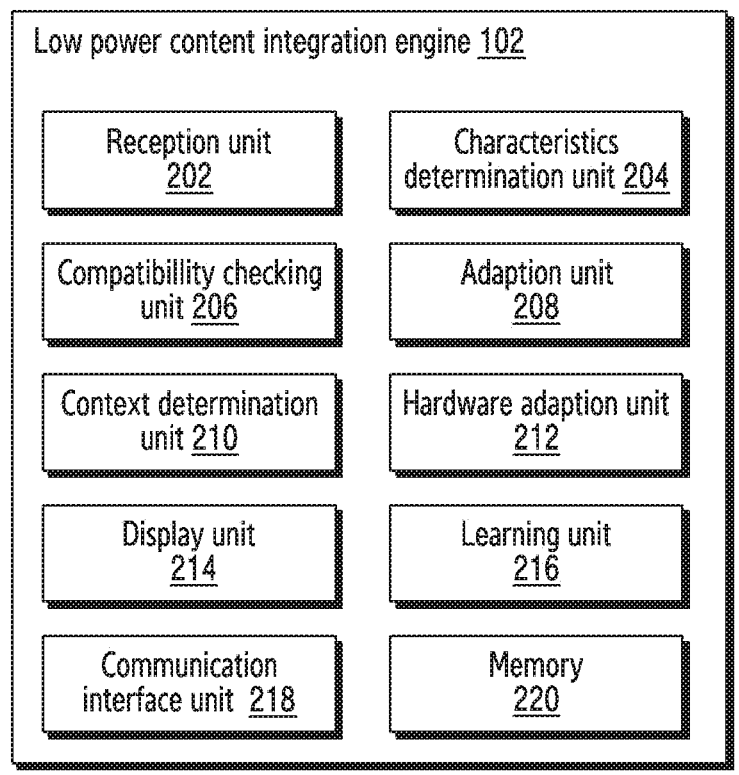
FIG. 2 is a block diagram illustrating various units of a LPCI engine for displaying content on a LPD of an electronic device according to an embodiment of the disclosure.

FIG. 2 is a block diagram illustrating various units of a LPCI engine for displaying content on the LPD of an electronic device according to embodiments as disclosed herein.

Referring to FIG. 2, the LPCI engine 102 includes a reception unit 202, a characteristics determination unit 204, a compatibility checking unit 206, an adaption unit 208, a context determination unit 210, a hardware adaption unit 212, a display unit 214, a learning unit 216, a communication interface unit 218 and a memory 220.

The reception unit 202 can be configured to receive the content which needs to be displayed on the LPD 108. The characteristics determination unit 204 can be configured to analyze the content for determining the characteristics of the content. The characteristics of the content can include display characteristics and touch input characteristics. The display characteristics can be, but is not limited to, histogram information, color depth, luminance, pixel power, and so on with respect to display. The touch input characteristics can include control elements such as, but not limited to, buttons, input elements and so on with respect to touch.

The characteristics determination unit 204 can be further configured to obtain constraints associated with the LPD 108 and the LPT 110. The constraints associated with the LPD 108 and the LPT 110 can be obtained based on related technology (e.g., active-matrix organic light-emitting diode (AMOLED), liquid crystal display (LCD) and so on). The constraints associated with the LPD 108 and the LPT 110 can be operational constraints to achieve power and performance key performance indicators (KPIs). The constraints associated with the LPD 108 can be, but is not limited to, frame per second (FPS), color depth and so on. The constraints associated with the LPT 110 can be, but is not limited to, area of touch recognition, reduction in scanning rate, and so on.

The compatibility checking unit 206 can be configured to perform compatibility check for determining the portions of the content which can be compatible with at least one of the LPD 108 and the LPT 110. The compatibility checking unit 206 correlates the display characteristics of the content with the constraints associated with the LPD 108 to determine the compatibility of the portions of the content with the LPD 108. Similarly, the compatibility checking unit 206 correlates the touch input characteristics of the content with the constraints associated with the LPT 110 to determine the compatibility of the portions of the content with the LPT 110. In an embodiment, the compatibility checking unit 206 uses a convolutional neural network (CNN) classifier for performing the compatibility check.

In an embodiment, the compatibility checking unit 206 may consider requirements such as, but not limited to, on pixel ratio and AOD limitations (i.e., AOD can have limited area of full screen), content brightness and a motion requirement, sound and network (data, global positioning system (GPS)) requirement compatibility, sensor usage and power compatibility, biometric and iris scanner compatibility, hardware interrupt and sleep wake up compatibility, and so on, for performing the compatibility check.

The adaption unit 208 can be configured to transform and place the portions of the content on the LPD 108 when the portions of the content can be compatible with the LPD 108. In order to place the portions of the content on the LPD 108, the adaption unit 208 performs the actions on the portions of the content based on the results of the compatibility check. The adaption unit 208 performs the actions on the portions of the content using a self-organizing feature map (SOFM) neural network. The adaption unit 208 provides the portions of the content to the display unit 214 for displaying on the LPD 108 without applying any transformation rules when the portions of content can be determined as compatible with the LPD 108. In an embodiment, the adaption unit 208 provides the portions of the content to the display unit 214 for displaying on the LPD 108 with LPT enabled without applying any transformation rules when the portions of content can be determined as compatible with the LPD and the LPT 110.

The adaption unit 208 applies the transformation rules on the portions of the content within a pre-defined threshold to place the portions of the content for display. The transformation rules can be applied by determining that the portions of the content requires transformation in order to be compatible with at least one of the LPD 108 and the LPT 110. For example, the adaption unit 208 may adjust (crop) a portion of the content when the portion of the content includes a barcode, or the like. The adaption unit 208 may apply a contrast enhancement filter on the portion of the content to increase readability when the total light output of display (in the AOD) is much below an ambient light (e.g., in sunlight). The adaption unit 208 may apply an invert color filter on the portion of the content when the color distribution is determined as less and majority color is determined as white. The adaption unit 208 limits FPS when the portion of the content has more FPS. The adaption unit 208 may reduce the color bit depth and apply an enhancement filter to shift the portion of the content towards the AOD color gamut. The adaption unit 208 may enable touch only for a region of interest when the region of interest is determined to be an interactive control. The adaption unit 208 may enhance the content/text size for better readability when the AOD has less brightness. The adaption unit 208 may hide or view the portion of the content based on authentication (e.g., a biometric input, a hardware button, and so on). The adaption unit 208 may decide a content target based on the context or the location of a user. The adaption unit 208 may apply AOD preferences based on a geographic AOD policy. The adaption unit 208 may translate a position and transform a size of the portion of the content based on the AOD constraints and a grip sensor.

The transformation rules vary based on the characteristics of the content and constraints associated with the LPD 108 and LPT 110. For example, in order to adapt the navigation application (map) and the game application with the LPD 108 and the LPT 110, the adaption unit 208 may apply color quantization, perform contrast enhancement based on ambient lighting, restrict FPS, resize the application layout, and enable touch only on individual input controls. In an example, for adapting the music widget with the LPD 108 and the LPT 110, the adaption unit 208 may apply color quantization, perform contrast enhancement based on ambient lighting, restrict FPS and enable touch only on individual input controls. In an example, for making a health and fitness application and a travel application compatible with the LPD 108 and the LPT 110, the adaption unit 208 may apply color quantization, perform contrast enhancement based on ambient lighting, and restrict FPS.

In an embodiment, the adaption unit 208 can apply transformation rules on the portions of the content based on previous learning.

The adaption unit 208 recommends a modified version of the portions of the content for displaying on the LPD 108 when the portions of the content/the content can be determined as incompatible with at least one of the LPD 108 and the LPT 110. The modified version of the portions of the content can include at least one of alternate portions of the content and the alternate content. The adaption unit 208 recommends the modified version of the portions of the content based on factors such as, but not limited to, location, policy derived data analytics, features learned using a machine learning model, and so on. For example, the adaption unit 208 may recommend the alternate content when heavy graphic games, video players, social applications are determined to be incompatible with the AOD or the AOT due to high FPS, high interaction, drastic color change, different variety of content, and so on.

The context determination unit 210 can be configured to determine a suitable location/place on the LPD 108 for placing the portions of the content. The context determination unit 210 uses contextual information of the electronic device 100 to determine the suitable location for placing the portions of the content. The context determination unit 210 obtains the contextual information from sensors such as, but not limited to, grip sensors, light sensors, and so on. The context information can be, but is not limited to, status of grip (e.g., information from the grip sensor), left or right handed operations, orientation status of the electronic device (e.g., portrait, landscape, and so on), ambient lighting condition of the electronic device 100 (e.g., information obtained from light sensor,) and so on.

The hardware adaption unit 212 can be configured to configure settings for the LPD 108 and the LPT 110 based on operational requirements of the content. For example, the hardware adaption unit 212 configures the settings for the LPD 108 and the LPT 110 when the operational requirements for the portion of content is found to be less than the constraints associated with the LPD 108 and the LPT 110.

The display unit 214 can be configured to display the portions of the content on the LPD 108 on receiving the portions of the content from the adaption unit 208. In an embodiment, the display unit 214 can be configured to display the portions of the content on the LPD 108 with LPT enabled. The portions of the content can be at least one of the portions of the content without transformation, the transformed portions of the content, and the alternate portions of the content and the alternate content. In an embodiment, the display unit 214 displays the portions of the content based on factors such as, but not limited to, contextual information of the electronic device, the configured settings for at least one of the LPD 108 and the LPT 110, and so on.

The learning unit 216 can be configured to learn information about the results of the compatibility check and the transformation rules. Thus, on receiving new content, requirement for compatibility check and information about the transformation rules can be determined based on the information learned, which further reduces computation time.

The communication interface unit 218 can be configured to communicate with the cloud server 112.

The memory 220 can be configured to store the content, results of the compatibility check, transformation rules, configured display/touch settings, and so on. The memory 220 may include one or more computer-readable storage media. The memory 220 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 220 may, in some examples, be considered a non-transitory storage medium. The term "non-transitory" may indicate that the storage medium is not embodied in a carrier wave or a propagated signal. However, the term "non-transitory" should not be interpreted to mean that the memory 220 is non-movable. In some examples, the memory 220 can be configured to store larger amounts of information than the memory. In certain examples, a non-transitory storage medium may store data that can, over time, change (e.g., in random access memory (RAM) or cache).

FIG. 2 shows units of the LPCI engine 102, but it is to be understood that other embodiments are not limited thereon. In other embodiments, the LPCI engine 102 may include less or more number of units. Further, the labels or names of the units are used only for illustrative purpose and does not limit the scope of the embodiments herein. One or more units can be combined together to perform same or substantially similar function in the LPCI engine 102.

Figure 3A:
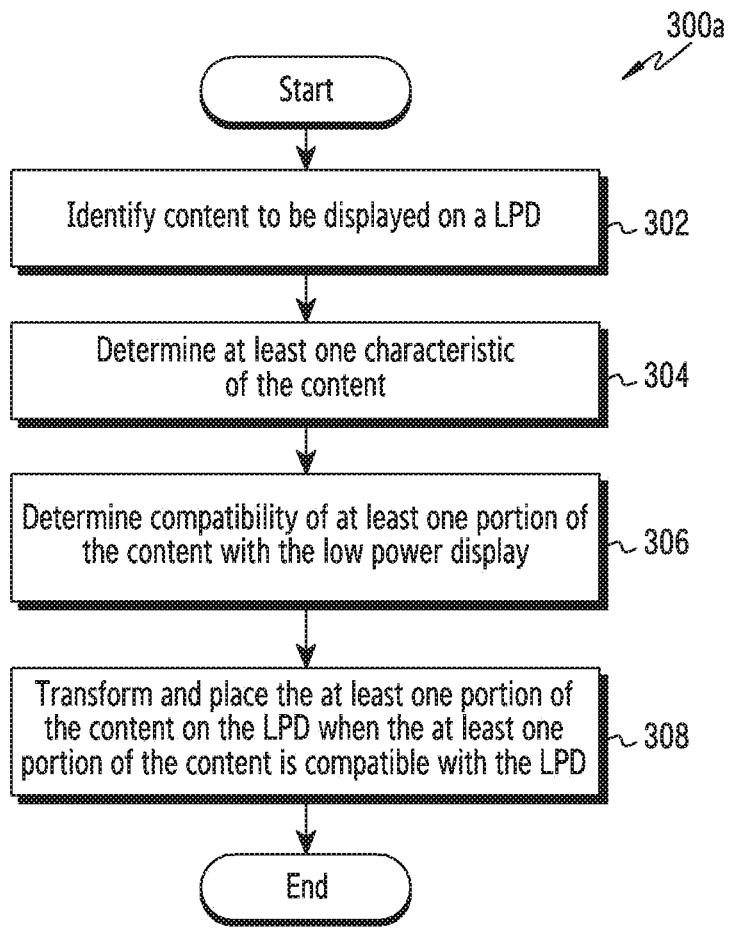
FIG. 3A is a flow diagram illustrating a method for displaying content on a LPD of an electronic device according to an embodiment of the disclosure.

FIG. 3A is a flow diagram illustrating a method for displaying content on an LPD of an electronic device according to an embodiment of the disclosure.

Referring to FIG. 3A, a method 300a for displaying content includes identifying the content to be displayed on the LPD 108 at operation 302. The method 300a allows the reception unit 202 to receive the content to be displayed on the LPD 108.

At operation 304, the method includes determining the characteristics of the content. The method allows the characteristics determination unit 204 to determine the characteristics of the content.

At operation 306, the method includes determining the compatibility of the at least one portion of the content with the LPD 108. The method allows the compatibility checking unit 206 to perform the compatibility check for determining the compatibility of the at least one portion of the content with the LPD 108. The compatibility checking unit 206 performs the compatibility check using the CNN classifier. The compatibility checking unit 206 correlates the characteristics of the content with the constraints associated with the LPD 108 to check the compatibility of the portion of the content with the LPD 108. Thus, the portions of the content which can be compatible with the LPD 108 can be classified using the CNN classifier.

At operation 308, the method includes transforming and placing the portions of the content on the LPD 108 when the portions of the content can be compatible with the LPD 108. The method allows the adaption unit 208 to transform and place the portions of the content on the LPD when the portions of the content can be compatible with the LPD 108. Based on the results of the compatibility check, the adaption unit 208 performs the actions to place the portions of the content on the LPD 108. The actions can be at least one of recommending the portion of the content without applying the transformation rules, recommending the portion of the content by applying the transformation rules, and recommending the alternate portion of the content/the alternate content for displaying on the LPD 108. The adaption unit 208 can recommend the portion of the content without applying the transformation rules in response to determining that the portion of the content adapts with the LPD 108 without requiring any changes. The adaption unit 208 applies the transformation rules on the portion of the content when the portion of the content requires transformation. The adaption unit 208 recommends the alternate portion of the content when the portion of the content can be determined as incompatible with the LPD 108. Thus, the content can be integrated into the low power mode of operations for display and touch environment with an improved power profile.

The various actions, acts, blocks, or the like in the method and the flow diagram 300a may be performed in the order presented, in a different order or simultaneously. Further, in some embodiments, some of the actions, acts, blocks, or the like may be omitted, added, modified, skipped, or the like without departing from the scope of the disclosure.

Figure 3B:
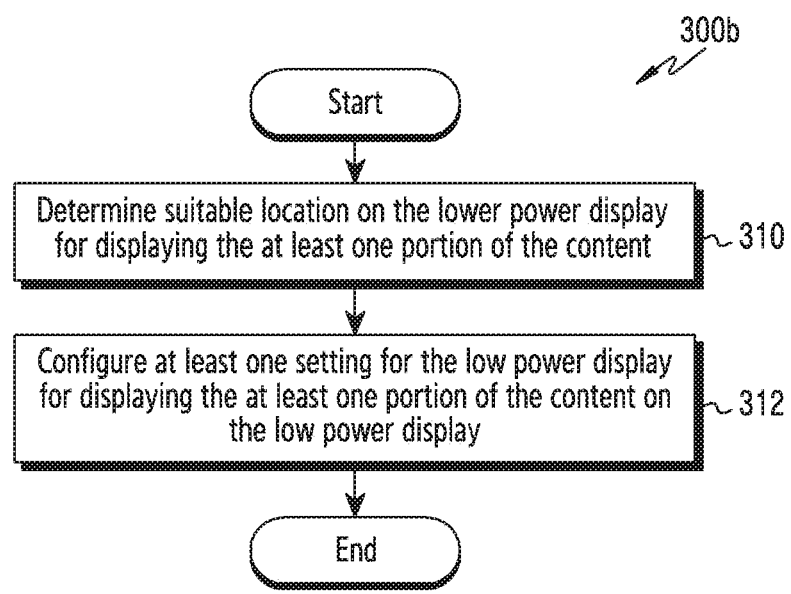
FIG. 3B is a flow diagram illustrating a method for displaying a compatible portion of content on a LPD according to an embodiment of the disclosure.

FIG. 3B is a flow diagram illustrating a method for displaying a compatible portion of content on a LPD according to an embodiment of the disclosure.

Referring to FIG. 3B, a method 300b includes determining the suitable location on the LPD 108 for displaying the portion of the content. The method 300b allows the context determination unit 210 to determine the suitable location on the LPD 108 for displaying the portion of the content on the LPD 108. The portion of the content can be at least one of an original portion of content (without transformation), the transformed portion of the content, the alternate portion of the content and the alternate content. The suitable location can be determined using the contextual information of the electronic device 100. The contextual information can be obtained from the sensors such as, grip sensors, light sensors and so on.

At operation 312, the method includes configuring the settings for the LPD 108 for displaying the portion of the content on the LPD 108. The method allows the hardware adaption unit 212 to configure the settings for the LPD 108 for displaying the portion of the content on the LPD 108. The portion of the content can be an original portion of content (without transformation), the transformed portion of the content, the alternate portion of the content, and the alternate content. The settings can be configured based on the operational requirements of the content. Thus, the LPD configurations can be optimized for displaying the content on the LPD 108.

The various actions, acts, blocks, operations or the like in the method and the flow diagram 300b may be performed in the order presented, in a different order or simultaneously. Further, in some embodiments, some of the actions, acts, blocks, operations or the like may be omitted, added, modified, skipped, or the like without departing from the scope of the disclosure.

Figure 4:
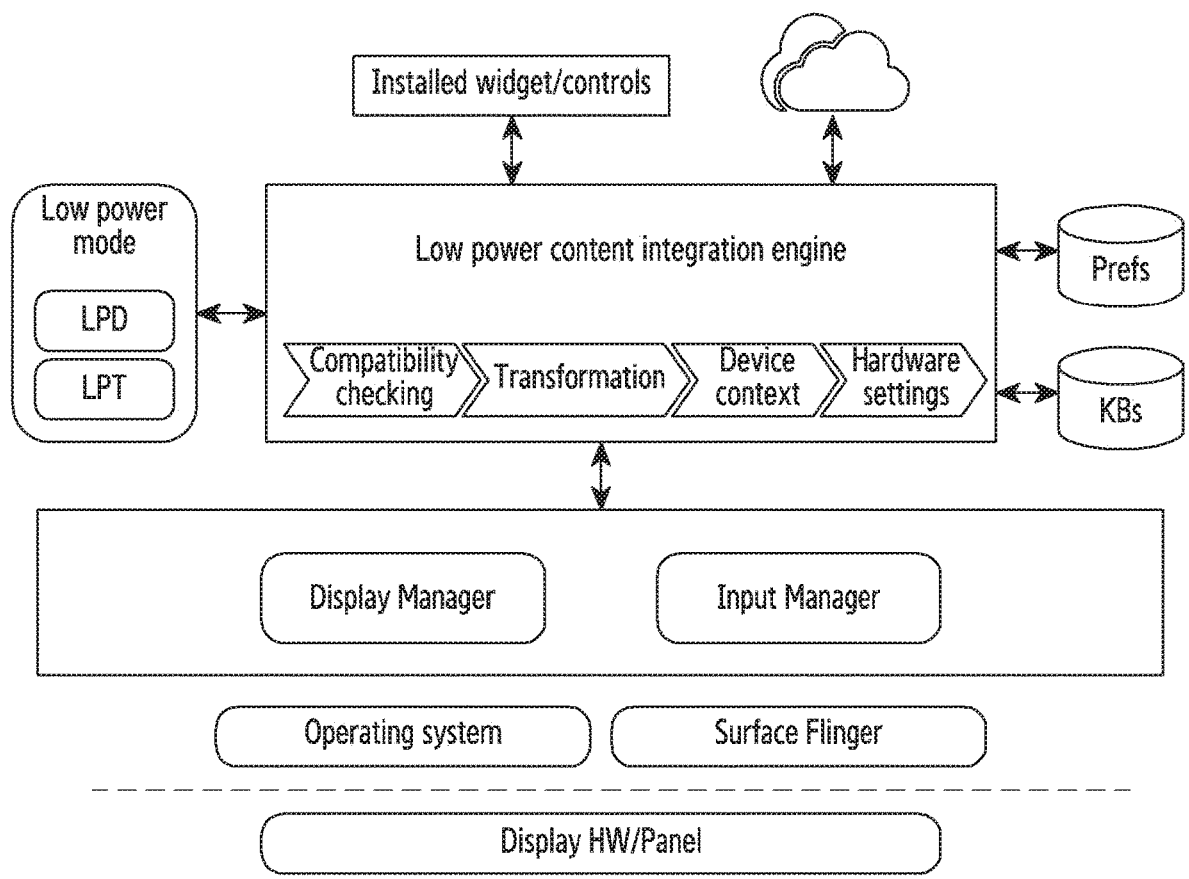
FIG. 4 depicts an example electronic device comprising of a LPCI engine for displaying content on a LPD with LPT enabled according to an embodiment of the disclosure.

FIG. 4 depicts an example electronic device comprising of a LPCI engine for displaying the content on an LPD 108 with LPT enabled according to an embodiment of the disclosure.

Referring to FIG. 4, the electronic device comprises of a display hardware/panel, an operating system, a windowing system (comprising a display manger, and an input manager), the LPCI engine 102, databases that include e of various preferences (prefs), knowledge bases (KB), a low power display module (comprising a LPD and a LPT), installed widgets/controls, and so on. The electronic device can be connected to the cloud server. The LPCI engine 102 performs evaluation and transformation of the content against the LPD and touch capabilities based on the characteristics of the content. Further, the LPCI engine 102 performs optimization of the low power hardware (i.e., the LPD and the LPT) against the operational requirements of the content.

Figure 5:
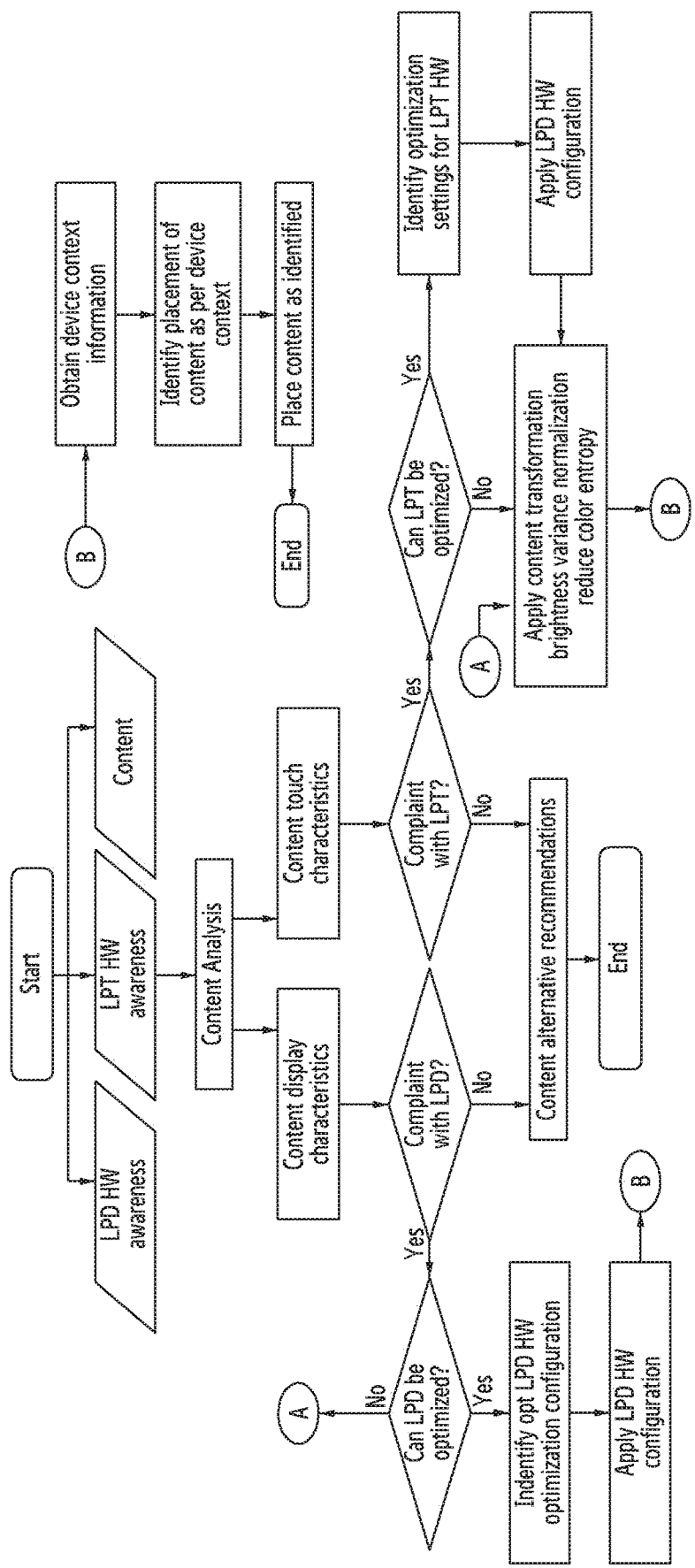
FIG. 5 is an example flow diagram illustrating content integration in a low power mode according to an embodiment of the disclosure.

FIG. 5 is an example flow diagram illustrating content integration in a low power mode according to an embodiment of the disclosure.

Referring to FIG. 5, the LPCI engine 102 may receive information about the content that needs to be displayed, and the constraints associated with the LPD 108 and the LPT 110. The LPCI engine 102 further analyzes the content and determines the display characteristics and the touch input characteristics related to the content.

Based on the identified characteristics, the LPCI engine 102 checks whether the display characteristics can be compatible with the LPD 108 or not. The LPCI engine 102 recommends the alternate content by determining that the content cannot be compatible with the LPD 108. If the content can be compatible with the LPD 108, the LPCI engine 102 checks for an optimization of the LPD configurations. If the configurations can be optimized, the LPCI engine 102 identifies the optimized configuration settings based on the operational requirements of the content. Further, the LPCI engine 102 configures the settings for the LPD 108. In addition, the LPCI engine 102 transforms the content by applying the set of rules. For example, the LPCI engine 102 transforms the content by normalizing brightness, reducing color entropy, and so on.

Similarly, the LPCI engine 102 checks whether the touch input characteristics can be compatible with the LPT 110. The LPCI engine 102 recommends the alternate content by determining that the content cannot be compatible with the LPT 110. If the content can be compatible with the LPT, the LPCI engine 102 checks for an optimization of the LPT configurations. If the configurations can be optimized, the LPCI engine 102 identifies the optimized configuration settings for the LPT 110 based on the operational requirements of the content. Further, the LPCI engine 102 configures the settings for the LPT 110. In addition, the LPCI engine 102 transforms the content by applying the set of rules. For example, the LPCI engine 102 transforms the content by normalizing brightness, reducing color entropy and so on.

After transforming the content and optimizing the LPD and the LPT configurations, the LPCI engine 102 obtains the contextual information of the electronic device. Based on the contextual information, the LPCI engine 102 identifies placement on the LPD 108 for the content. The LPCI engine 102 displays the content according to the identified placement on the LPD 108 with LPT enabled.

Figure 6A:
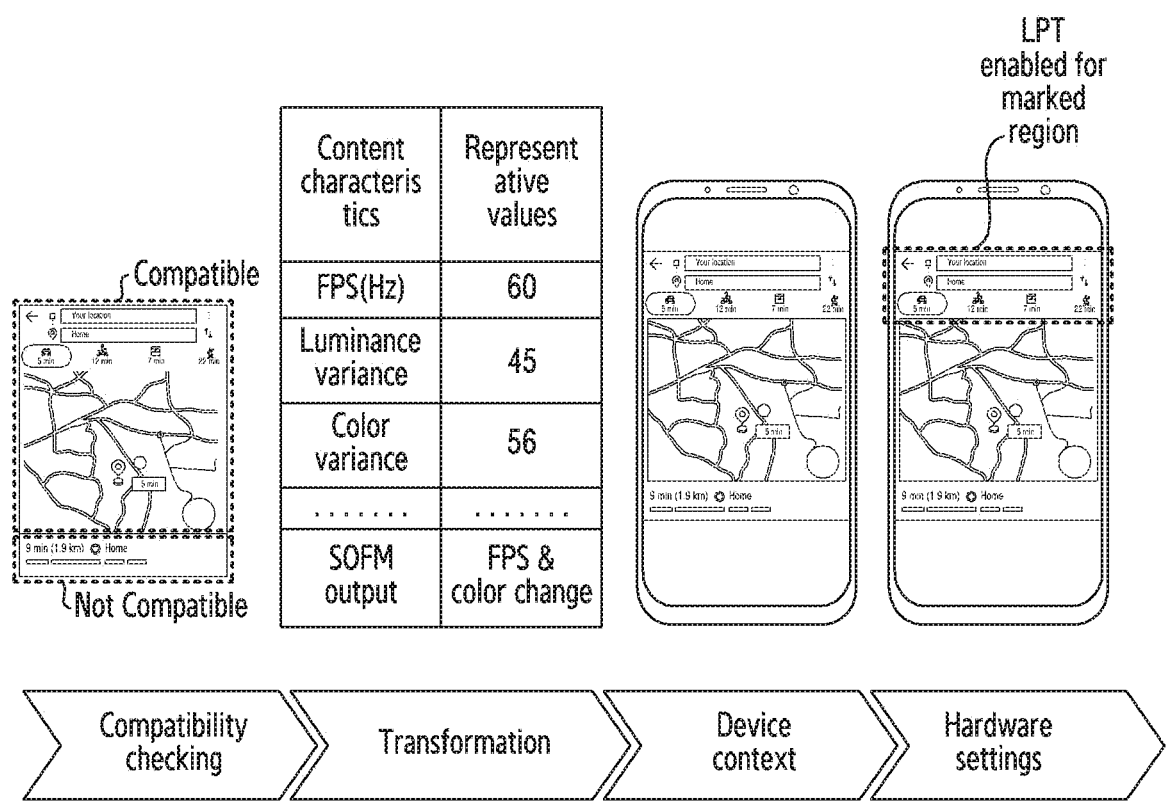
FIGS. 6A, 6B and 6C are example diagrams illustrating displaying of content on a LPD of an electronic device according to various embodiments of the disclosure.
Figure 6B:
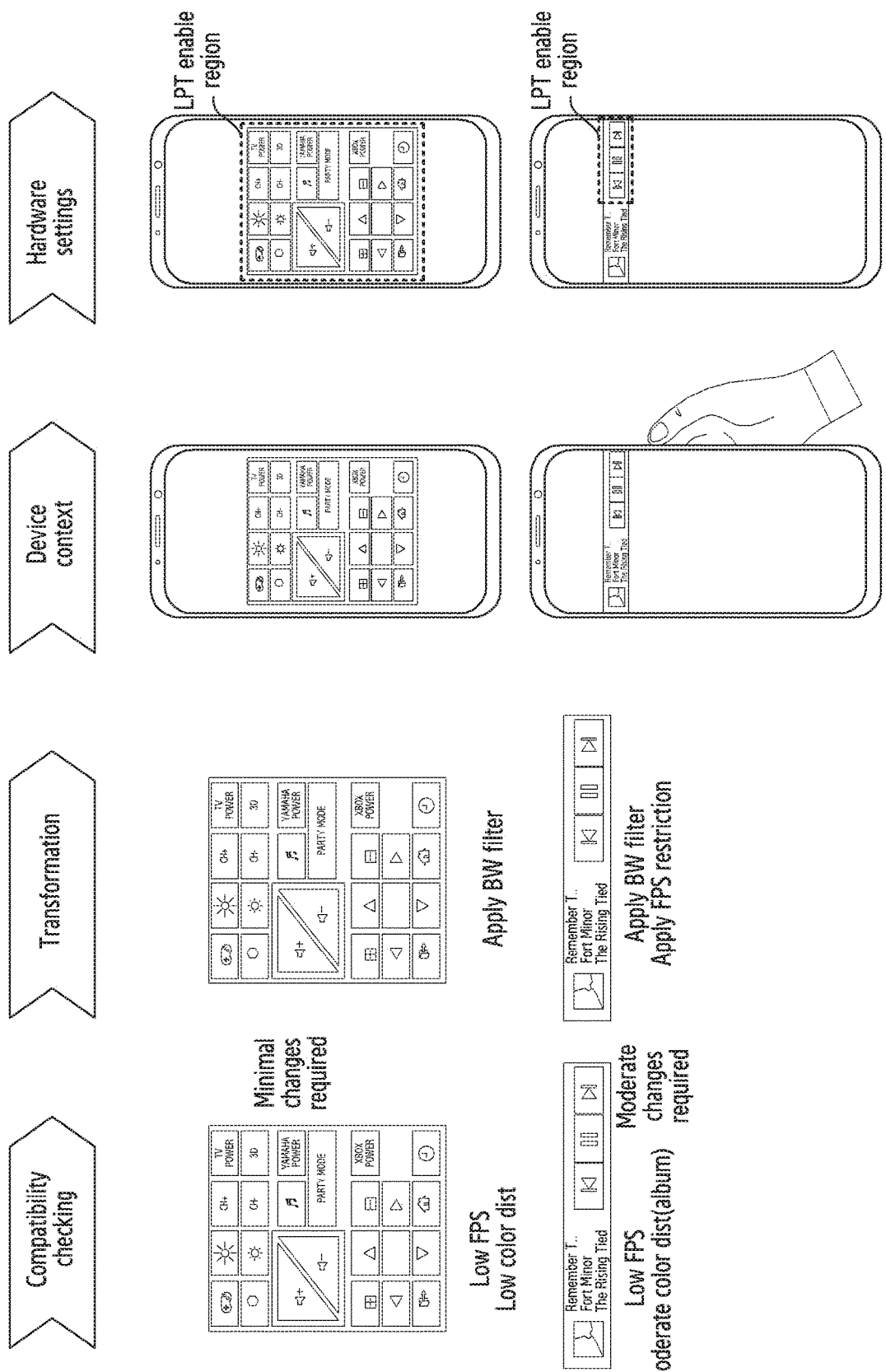
Figure 6C:
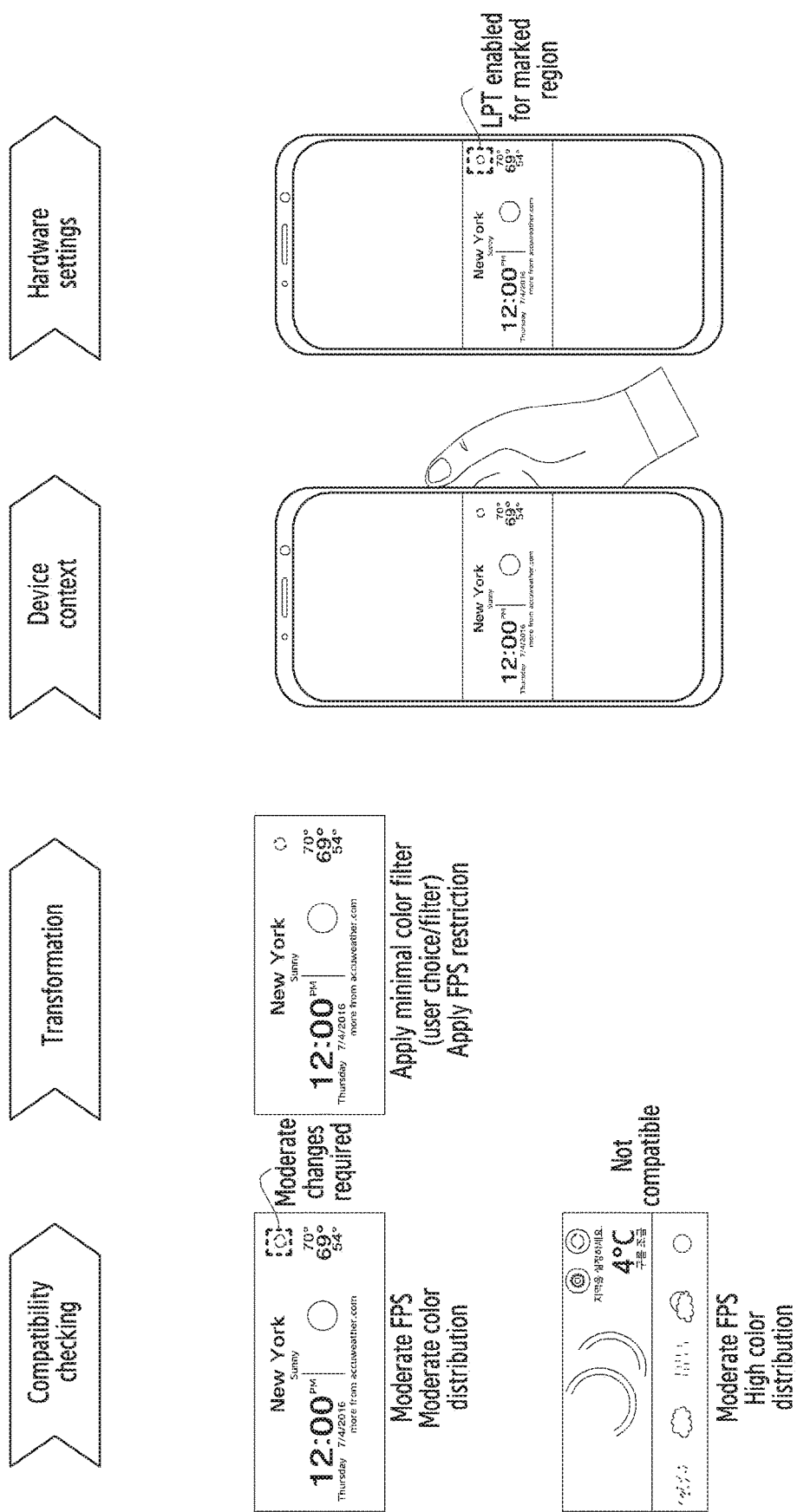

FIGS. 6A, 6B and 6C are example diagrams illustrating displaying content on an LPD of an electronic device according to an embodiment of the disclosure.

Referring to FIG. 6A, an example diagram illustrates display of a navigation application on the LPD 108 with LPT enabled. Referring to FIG. 6A, on receiving the navigation application, the LPCI engine 102 determines the characteristics and corresponding values related to the portions of the navigation application. The characteristics can be, but not limited to, FPS, luminance variance, color variance, and so on. The LPCI engine 102 uses the characteristics of the navigation application to perform the compatibility check. After determining that a portion of the navigation application can be compatible with the AOD and the AOT, the LPCI engine 102 performs transformation of the portion of the navigation application to be compatible with the AOD and the AOT. For example, the LPCI engine 102 may change the FPS and the color variance using local features and the SOFM neural network. Further, the LPCI engine 102 may use color quantization techniques. In addition, the LPCI engine 102 may restrict FPS and transform the portion of the navigation application to be AOD compatible.

Once the portion of the navigation application is transformed, the LPCI engine 102 identifies the suitable position on the AOD for the placement of the portion of the navigation application. The suitable position can be identified based on factors such as, but not limited to, size of the navigation application, grip, left or right hand operations, location, importance and so on.

Referring to FIG. 6A, the LPCI engine 102 configures the settings for the AOD and the AOT. Based on the identified position and the configured settings, the LPCI engine 102 displays the transformed portion of the navigation application on the AOD with enabled AOT for region of interest (i.e., the marked region as illustrated in FIG. 6A).

Referring to FIG. 6B an example diagram illustrates the display of remote control and play music widget on the LPD 108. The LPCI engine 102 may perform the compatibility check for determining whether the remote control widget and the play music widget is compatible with the AOD or the AOT. The remote control widget may require minimal changes to be compatible with the AOD and the AOT. The play music widget may require moderate changes to be compatible with the AOD and the AOT.

After determining that the remote control widget and the play music widget can be made compatible with the AOD and the AOT, the LPCI engine 102 performs transformation of the widgets. For example, the LPCI engine 102 applies a black-white (BW) filter on the remote control widget and transforms the remote control widget to be AOD compatible. Similarly, the LPCI engine 102 applies a BW filter and FPS restrictions on the play music widget and adapts the play music widget with the AOD and the AOT. The LPCI engine 102 identifies the suitable position on the AOD for the placement of the remote control widget and the play music widget based on usage, grip, and so on. Further, the LPCI engine 102 configures the settings for the AOD and the AOT. Based on the configured settings, the LPCI engine 102 displays the remote control and the play music widgets on the AOD with enabled AOT for marked regions (region of interest) as illustrated in FIG. 6B.

Referring to FIG. 6C, an example diagram illustrates the display of weather widgets on the LPD 108 with LPT enabled for at least one region of interest areas. Embodiments herein enable the LPCI engine 102 to perform the compatibility check for determining whether the first and second weather widgets can be compatible or not with the AOD or the AOT.

After determining that the second widget cannot be compatible with the AOD and the AOT, the LPCI engine 102 recommends alternate content. For example, after determining that the first weather widget can be compatible with the AOD and the AOT, the LPCI engine 102 performs transformation of the first weather widget. For example, the LPCI engine 102 applies minimal color filter and FPS restriction on the first weather widget. The LPCI engine 102 identifies the suitable position on the AOD for the placement of the weather widget based on a user's grip. Further, the LPCI engine 102 configures the settings for the AOD and the AOT. Based on the configured settings and the identified position, the LPCI engine 102 displays the weather widget on the AOD with the enabled AOT for control surface (marked region) as illustrated in FIG. 6C.

Figure 7:
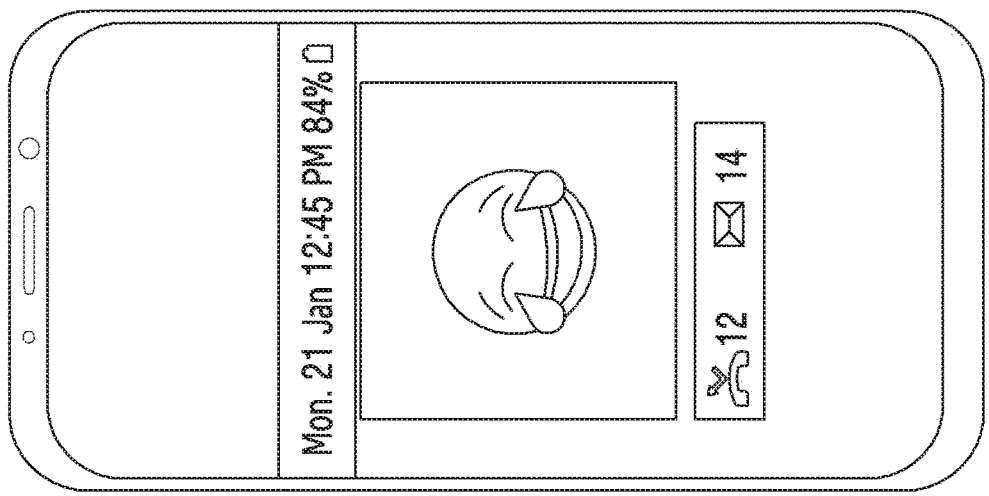
FIG. 7 is an example diagram illustrating context based display of content on a LPD of an electronic device according to an embodiment of the disclosure.
Figure 7:
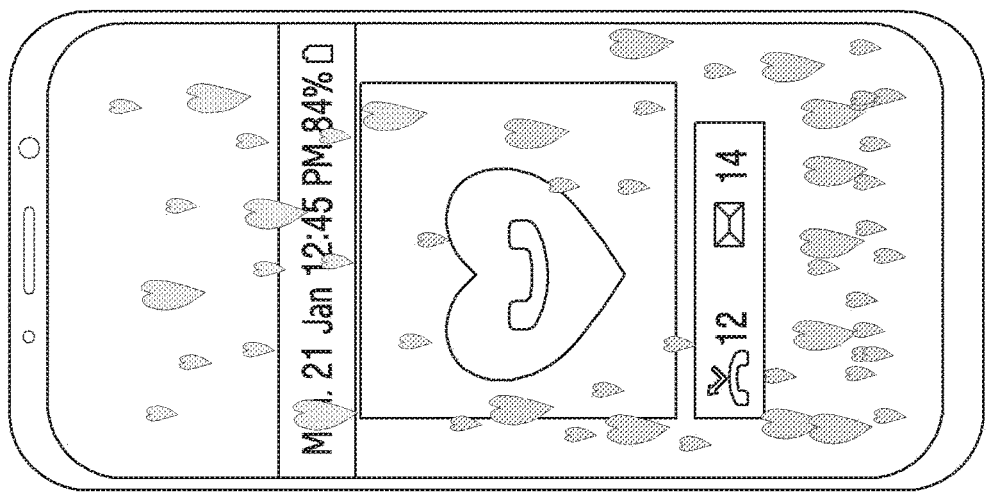
Figure 7:
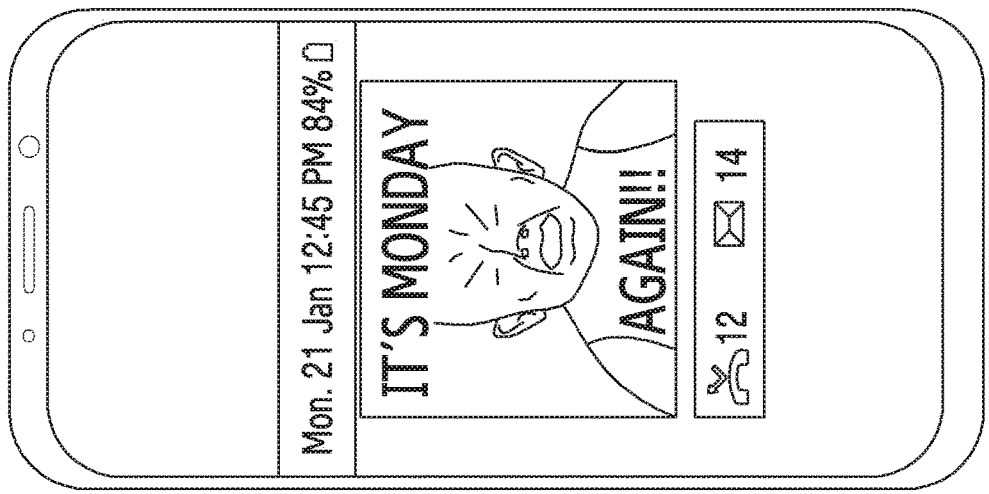

FIG. 7 is an example diagram illustrating context based display of the content on a LPD of an electronic device according to an embodiment of the disclosure.

Referring to FIG. 7, the LPCI engine 102 may display a related picture on the AOD on the specific weekday. Further, the LPCI engine 102 displays a specific type of animation on the LPD 108 when a person calls the user. Similarly, the LPCI engine 102 displays a specific type of emoji on the AOD in response to determining that the user is laughing.

Figure 8:
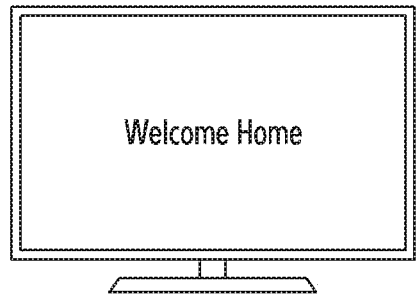
FIG. 8 is an example diagram illustrating context based display of text on a LPD of a television (TV) according to an embodiment of the disclosure.
Figure 8:
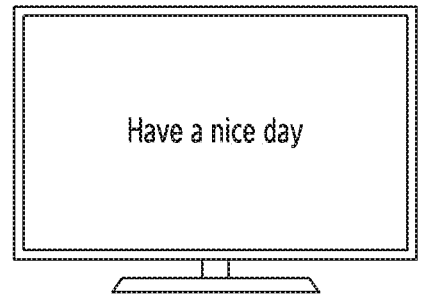
Figure 8:
Figure 8:
Figure 8:
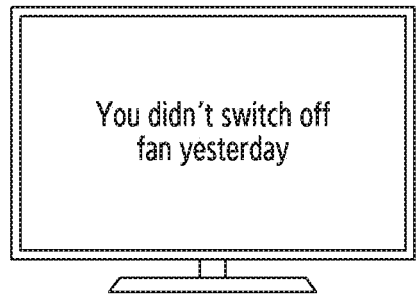
Figure 8:
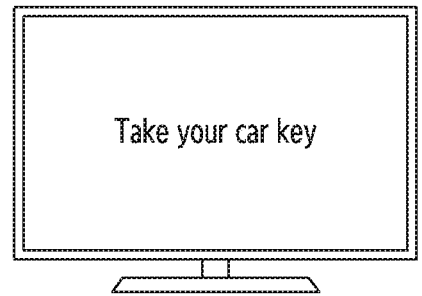

FIG. 8 is an example diagram illustrating context based display of text on a television (TV) according to an embodiment of the disclosure.

Referring to FIG. 8, the LPCI engine 102 may display useful information on the TV which supports the AOD. The useful information can be displayed by communicating with the user's mobile device. The LPCI engine 102 displays the useful information upon specific events such as, but not limited to, while entering home, while leaving home, and so on. For example, the LPCI engine 102 displays the text like "welcome home" while the user is entering the home and "have a nice day" while leaving the home. Also, the LPCI engine 102 displays daily updates on the AOD of the TV. The updates may be related to mail received by the user, authentication failures, and so on. Further, the LPCI engine 102 recommends the user to switch off the fan and take the car keys by displaying the recommendation text on the AOD of the TV while leaving the home.

Figure 9A:
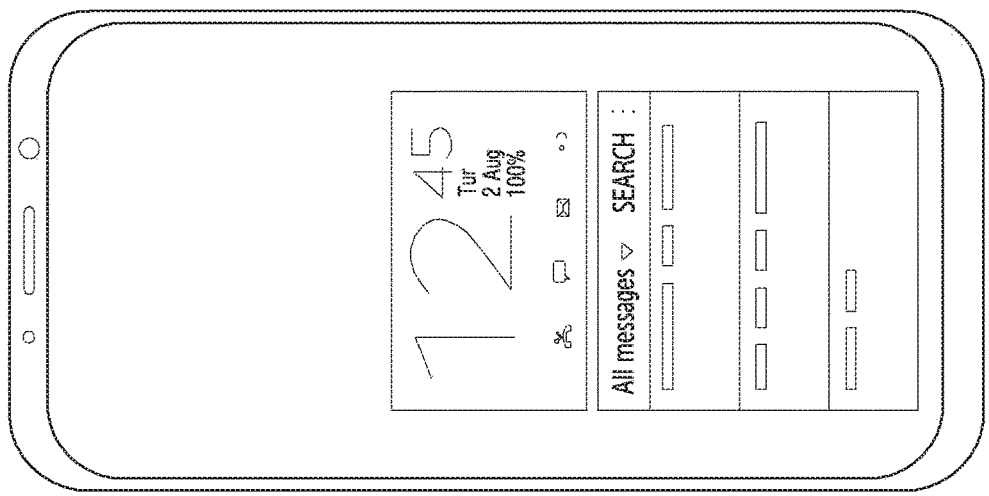
FIGS. 9A and 9B are example diagrams illustrating displaying private content on a LPD according to various embodiments of the disclosure.
Figure 9A:
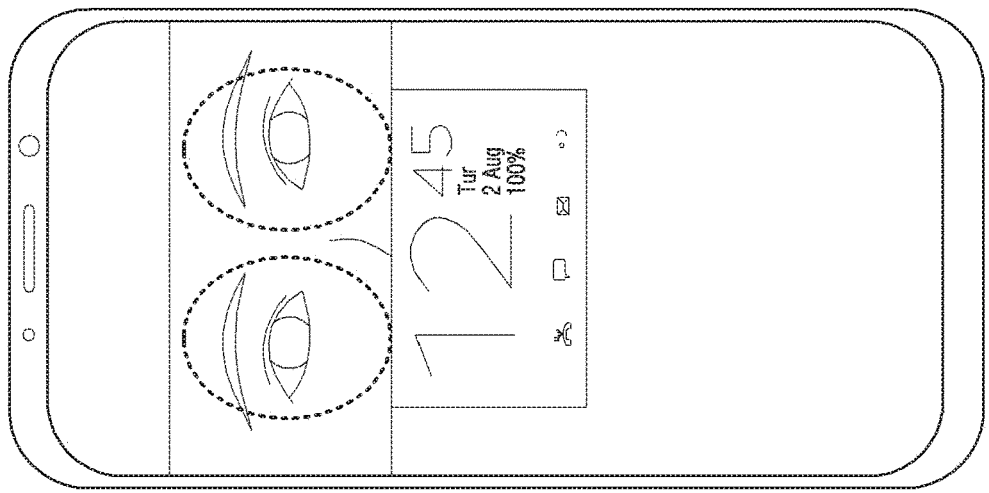
Figure 9A:
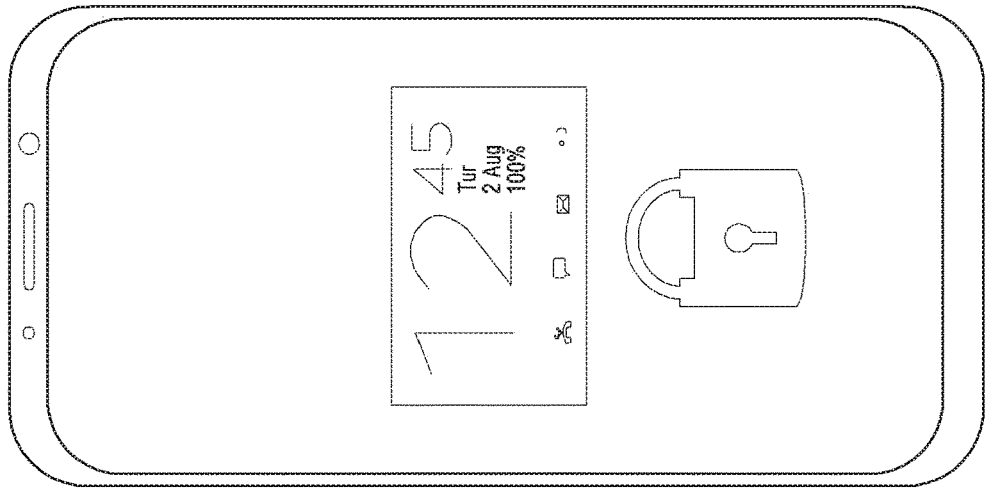
Figure 9B:
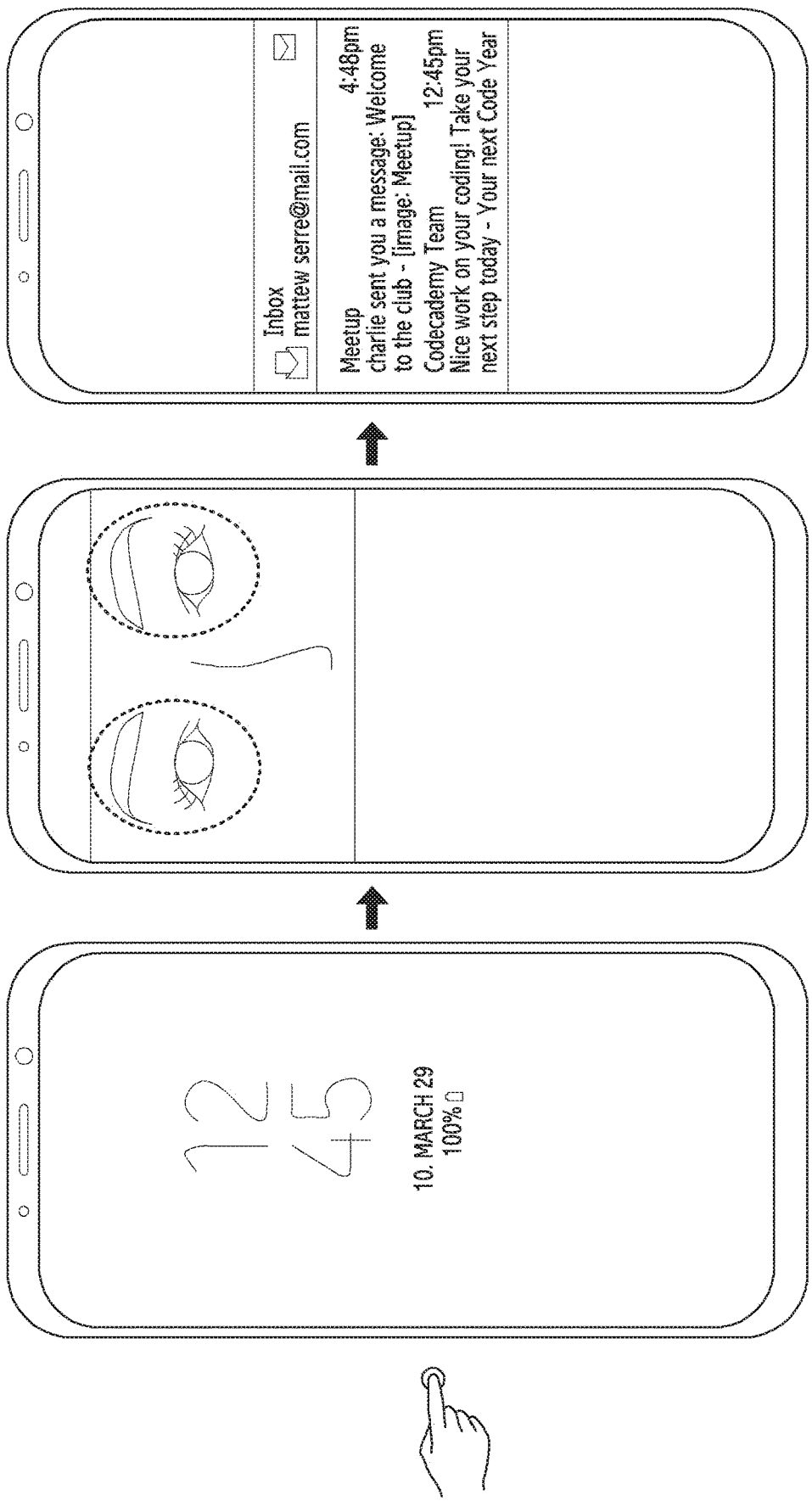

FIGS. 9A and 9B are example diagrams illustrating displaying private content on a LPD according to various embodiments of the disclosure.

Referring to FIG. 9A, the LPCI engine 102 displays the locked content on the AOD based on the content privacy. The content can be unlocked by performing biometric (face, iris, and so on) authentication. For example, once the iris authentication is successful, the LPCI engine 102 unlocks and displays the content on the AOD.

Referring to FIG. 9B, an example diagram illustrates usage of an AOD button for displaying private content on the AOD. Referring to FIG. 9B, the AOD button may be provided and the user may be allowed to press the AOD button for receiving the content. The AOD button triggers the authentication process such as an iris scan, a face identification scan, and so on based on user preferences. After successful authentication, the LPCI engine 102 displays the private content on the AOD.

Figure 10:
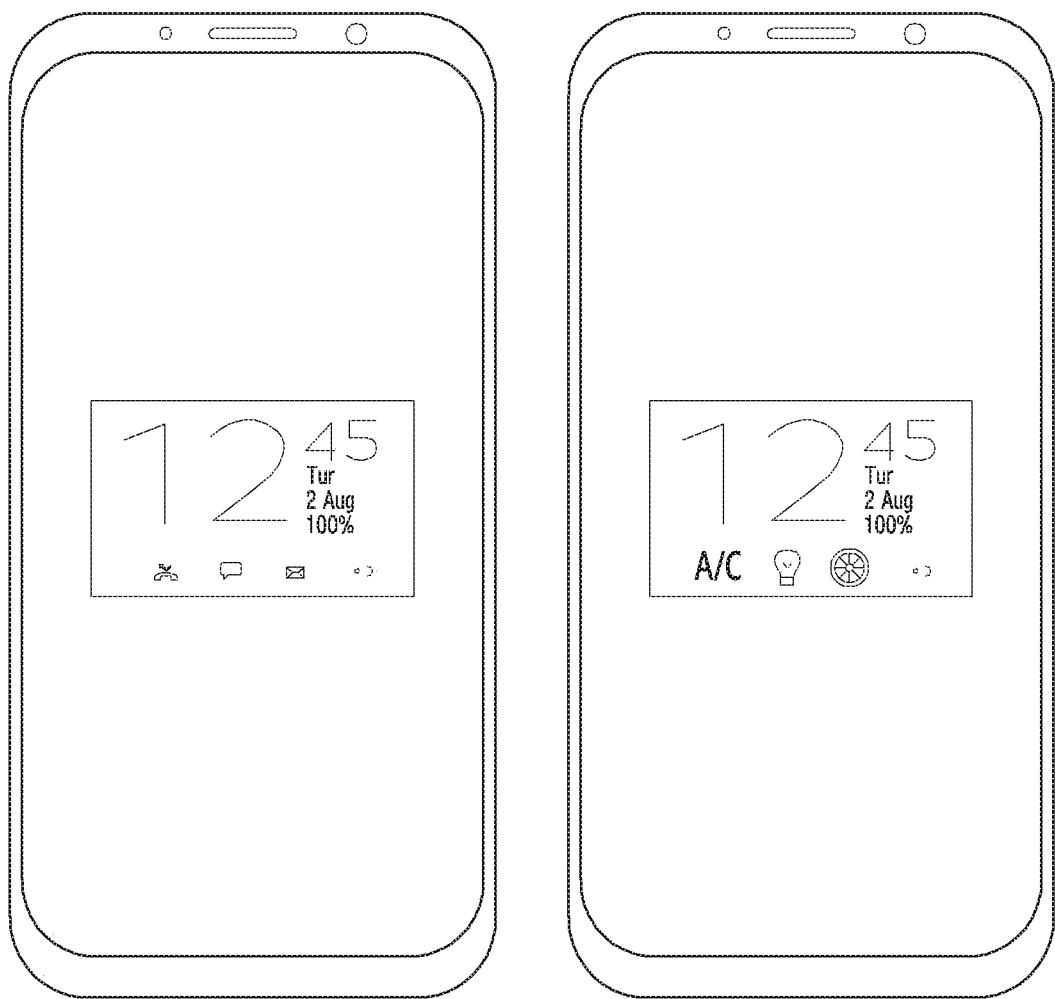
FIG. 10 is an example diagram illustrating display of personalized content on a LPD according to an embodiment of the disclosure.

FIG. 10 is an example diagram illustrating display of personalized content on a LPD according to an embodiment of the disclosure.

Referring to FIG. 10, the LPCI engine 102 may display the content on the AOD based on a location of the user. If the user is at the office, the LPCI engine 102 displays basic information on the AOD such as a clock, a calendar, and so on. If the user is at home, the LPCI engine 102 displays the information related to IoT devices present at the home on the AOD. Thus, the status of the IoT devices such as, but not limited to, an air conditioner, bulbs, fans, and so on can be displayed on the LPD based on the location of the user.

Figure 11:
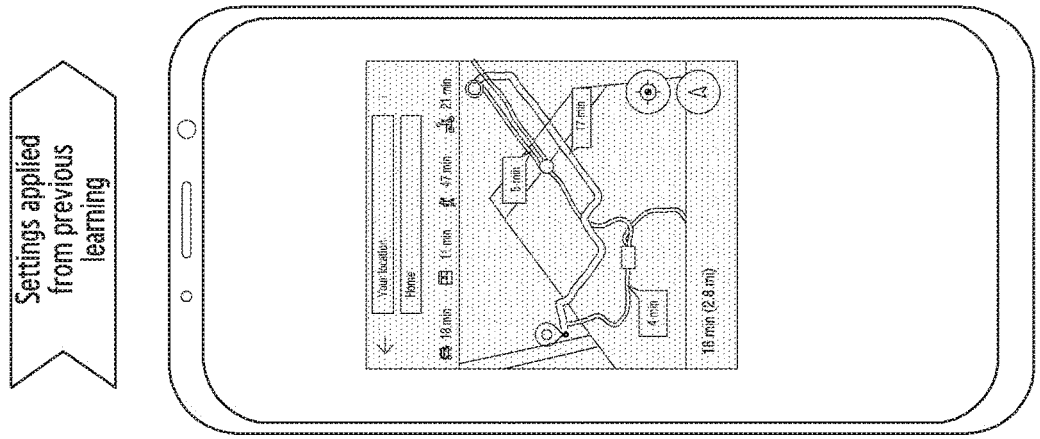
FIG. 11 is an example diagram illustrating display of content on a LPD based on previous learning, according to an embodiment of the disclosure.
Figure 11:
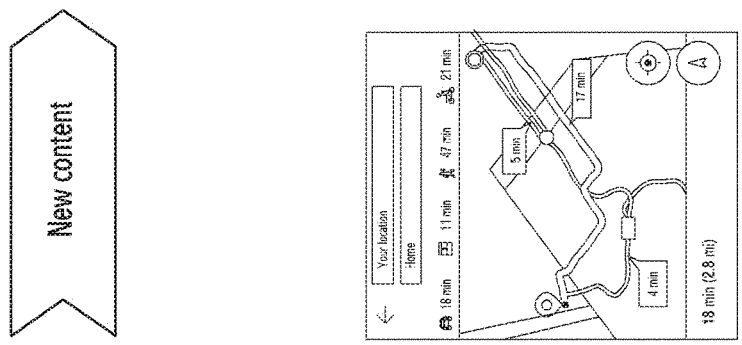
Figure 11:
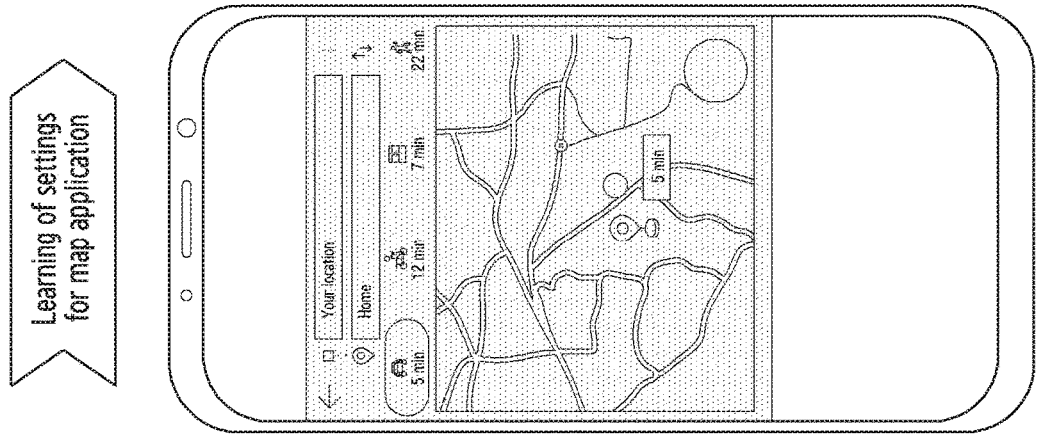

FIG. 11 is an example diagram illustrating display of content on a LPD based on previous learning according to an embodiment of the disclosure.

Referring to FIG. 11, the LPCI engine 102 may learn rules used for transformation of the content to display the content on the AOD. On receiving a new content similar to the previous displayed content, the LPCI engine 102 applies the rules and the settings from a previous learning to display the new content on the AOD.

Figure 12:
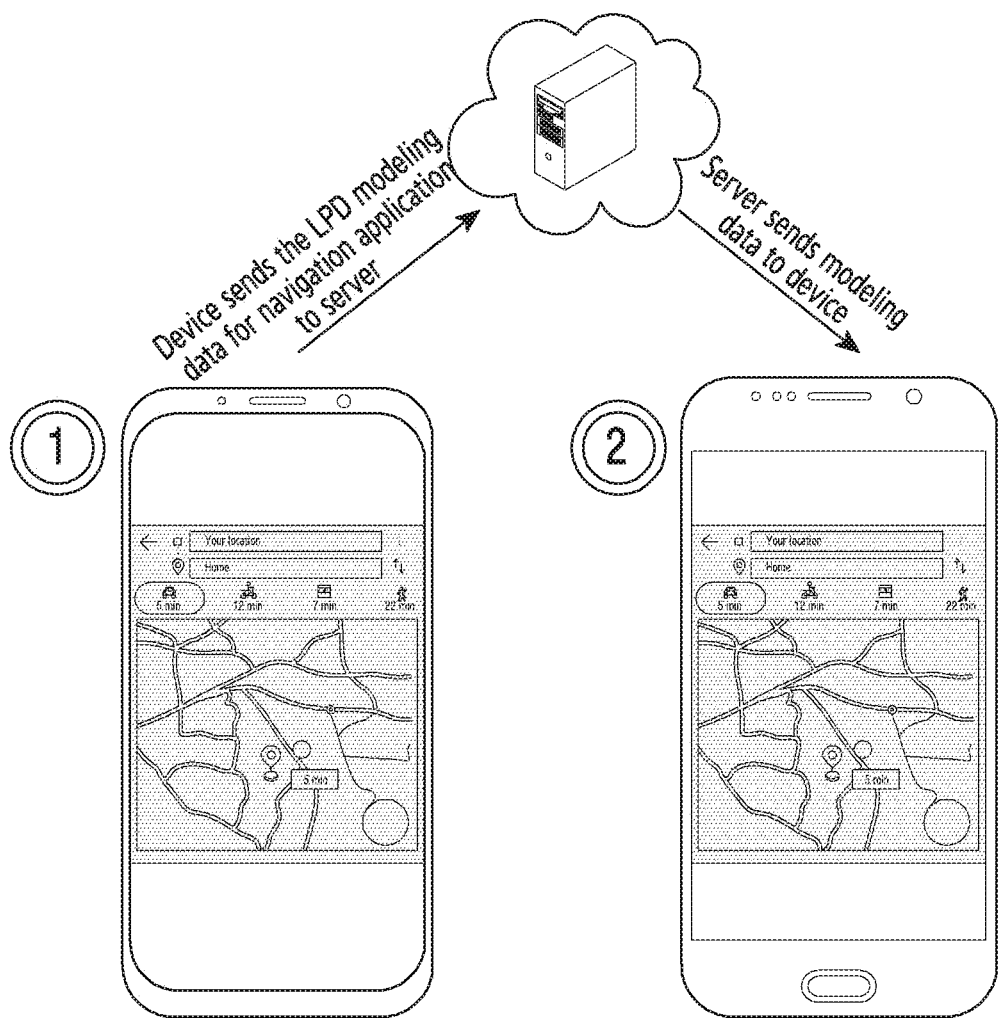
FIG. 12 is an example diagram illustrating communication between a LPCI engine and the cloud server for modeling data according to an embodiment of the disclosure.

FIG. 12 is an example diagram illustrating communication between a LPCI engine and a cloud server for modeling data, according to an embodiment of the disclosure.

Referring to FIG. 12, the LPCI engine 102 may send AOD modeling data (i.e., rules used for transformation) to the cloud server 112. On receiving the AOD modeling data, the cloud server 112 provides policies or recommendations based on a geographic region, a people category, and so on as additional inputs to modeling data to the LPCI engine 102 of the electronic device 100. For example, the LPCI engine 102 may send the rules used for transforming the navigation application to the server. On receiving and analyzing the rules, the cloud server 112 may understand the AOD preferences based on weather conditions of the user location and may recommend the LPCI engine 102 to enhance the brightness of the navigation application for better visibility.

Figure 13:
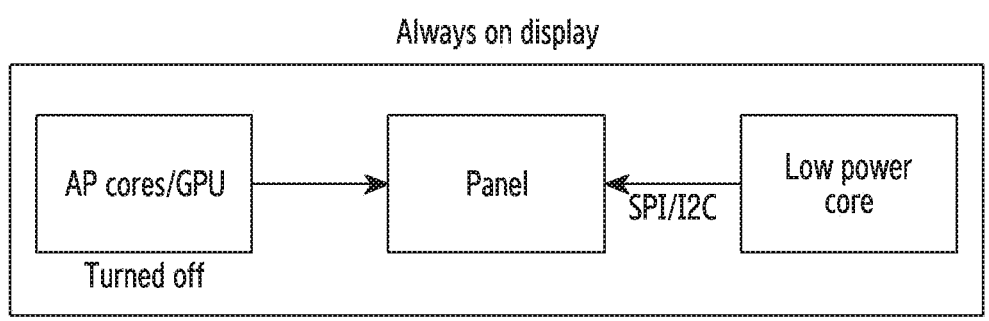
FIG. 13 is an example diagram illustrating utilization of a low power core for screen refresh while displaying content on a LPD according to an embodiment of the disclosure.

FIG. 13 is an example diagram illustrating utilization of a low power core for screen refresh while displaying content on a LPD according to embodiment of the disclosure.

Referring to FIG. 13, the LPCI engine 102 may enable the low power core in an AOD mode for refreshing AOD screen while displaying the content on the AOD. Thus, power consumption can be reduced. The low power core performs update functions such as, but not limited to, gathering of sensor data, handling stylus drawings, inferring context, making incremental user interface (UI) updates (e.g., navigation pointer movement), and so on.

Further, the low power core decides whether a full wake up mode or a co-operative mode is required to perform the screen refresh while displaying the content on the AOD. In the full wake up mode, the low power core operates along with an application processor (AP). The low power core performs update operations such as, but not limited to, performing face identification and finger print scanning, supporting game applications, and so on using feedback received from the AP.

Figure 14A:
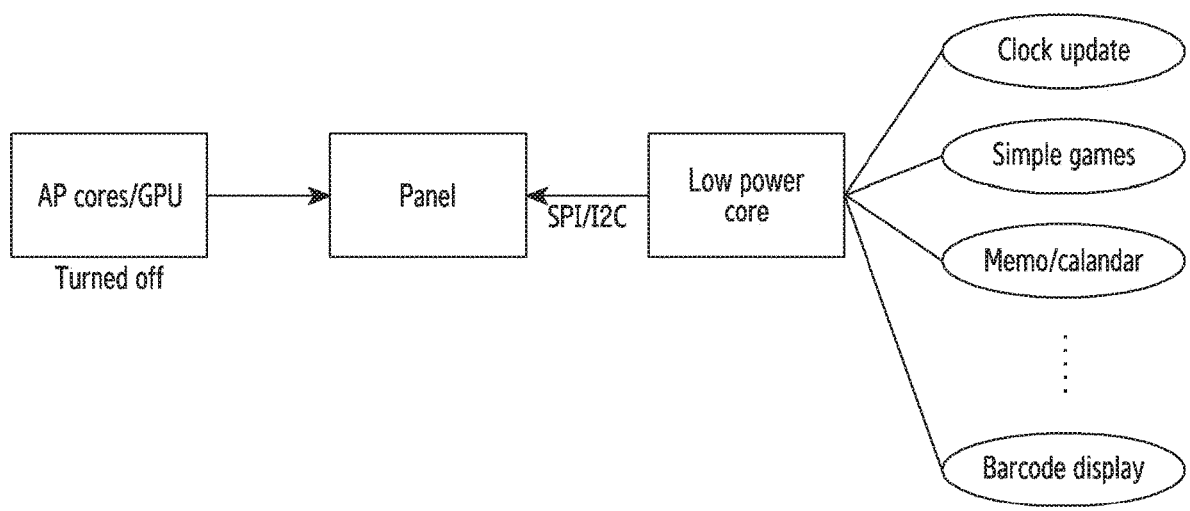
FIGS. 14A and 14B are example diagrams illustrating utilization of a low power core and an application processor for displaying content on a LPD according to various embodiments of the disclosure.
Figure 14B:
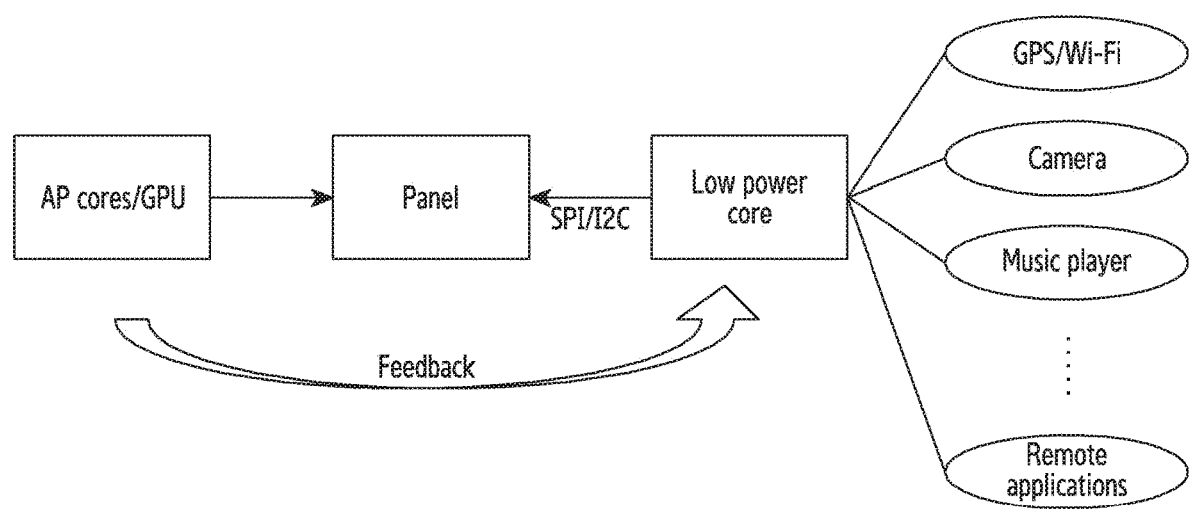

FIGS. 14A and 14B are example diagrams illustrating utilization of a low power core and an application processor for displaying content on a LPD according to various embodiments of the disclosure.

Referring to FIG. 14A, an example diagram illustrates the low power core supported content in the AOD mode. In the AOD mode, the LPCI engine 102 enables the low power core to perform functions such as, but not limited to, performing a clock update, performing a memo update and calendar schedules, displaying barcodes related to tickets (e.g., movie tickets, flight tickets, and so on), and so on. Also, simple games can be run by enabling the low power core.

Referring to FIG. 14B, an example diagram illustrates the low power core and the AP supporting content in the co-operative mode. In the co-operative mode, the LPCI engine 102 enables the AP to provide feedback to the low power core for performing operations such as, but not limited to, performing weather/navigation update, supporting image capture/selfie mode, supporting audio music play, supporting remotes and so on.

Figure 15A:
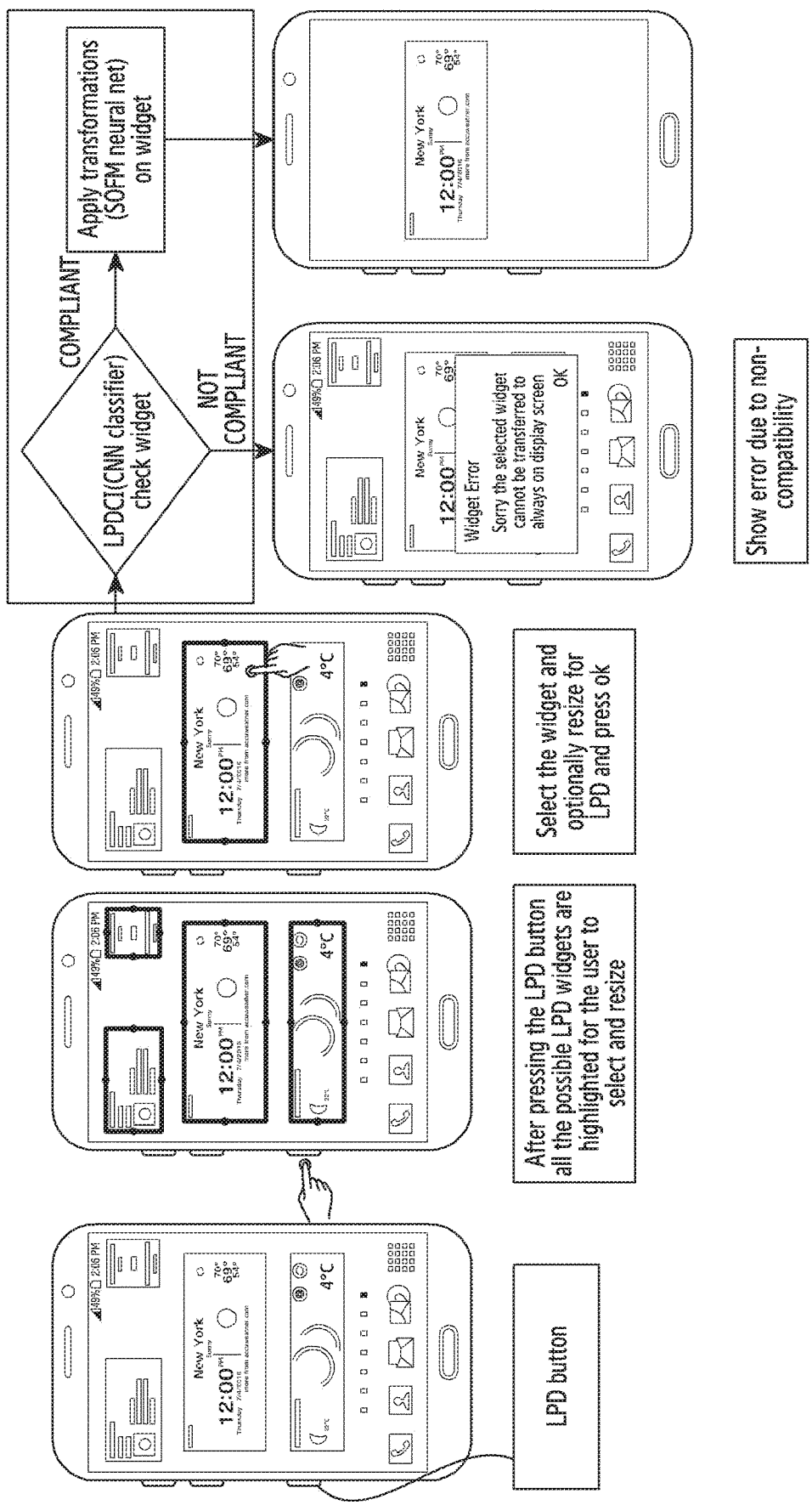
FIGS. 15A, 15B and 15C are example diagrams illustrating user interactions for displaying content on a LPD according to various embodiments of the disclosure.
Figure 15B:
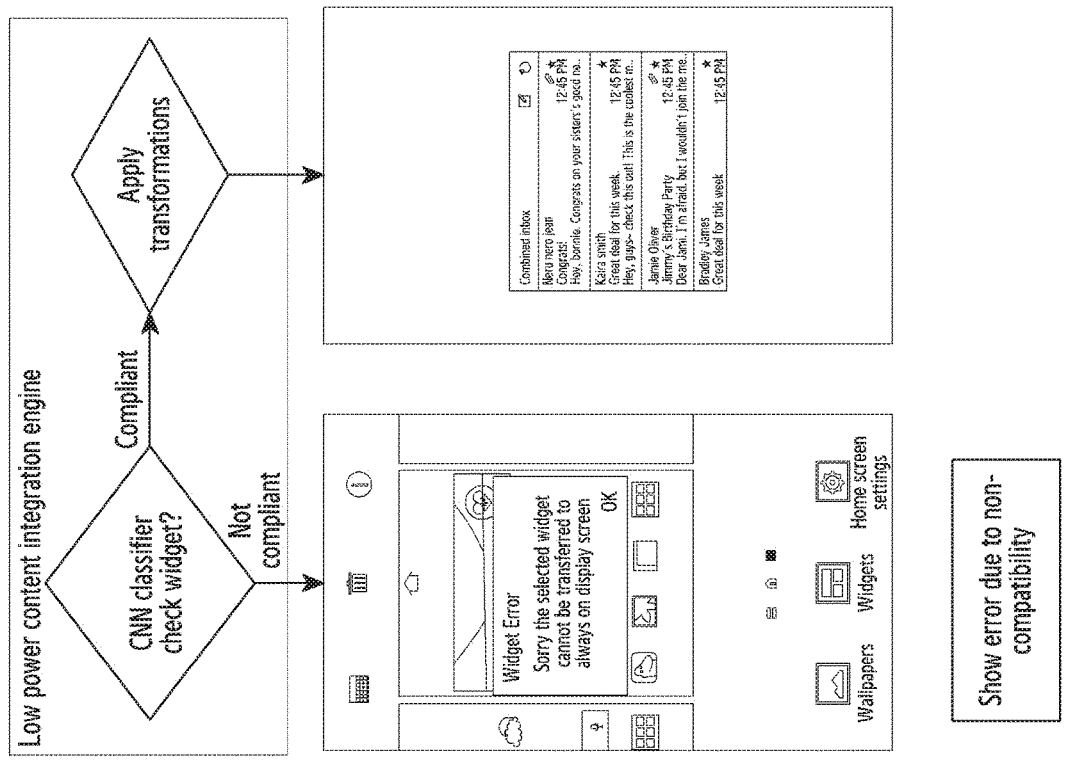
Figure 15B:
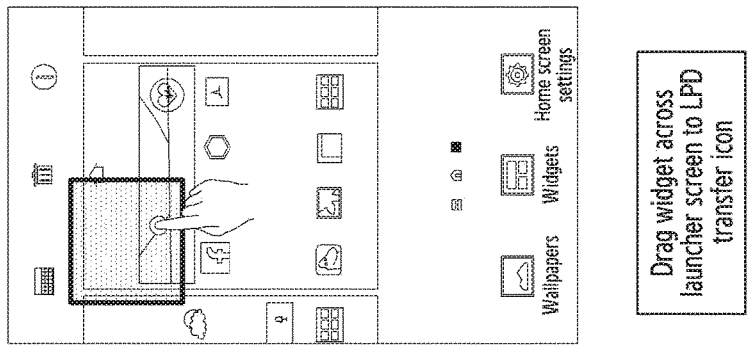
Figure 15B:
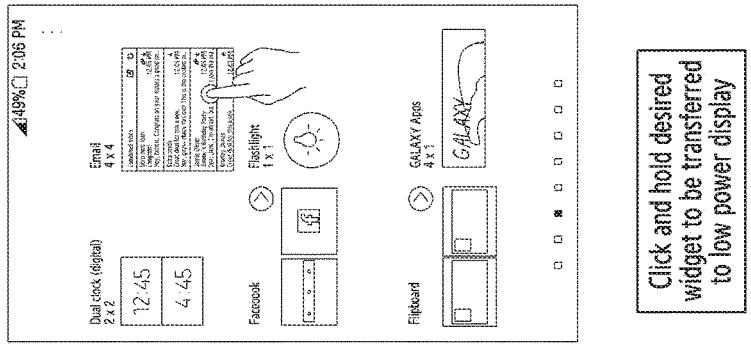
Figure 15C:
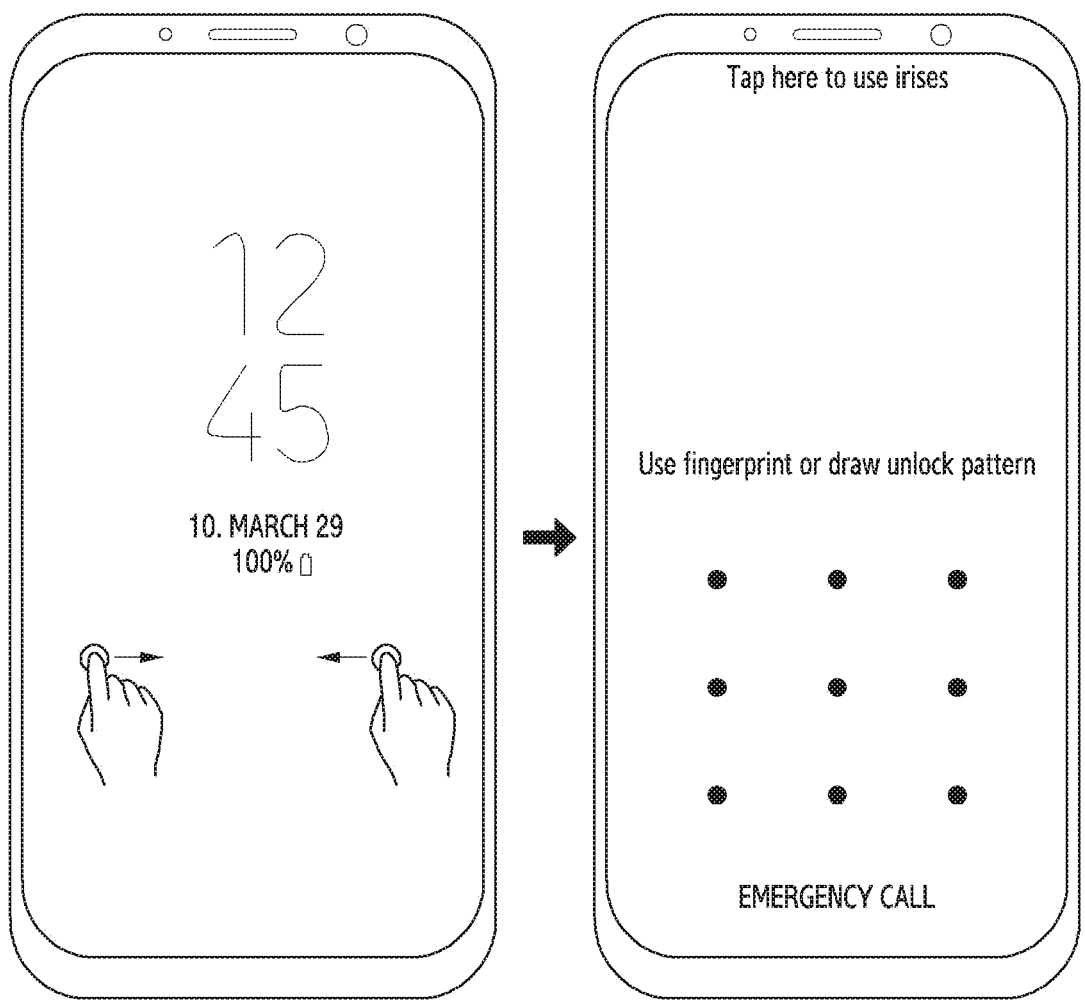

FIGS. 15A, 15B and 15C are example diagrams illustrating user interactions for displaying content on a LPD according to various embodiments of the disclosure.

Referring to FIG. 15A, an example diagram illustrates AOD user interaction with a hardware button of the electronic device 100. Embodiments herein allow the user to interact with an AOD hardware button of the electronic device 100. When the user presses the AOD button, the LPCI engine 102 can highlight all possible widgets for the user to select and resize. After selecting a widget, the LPCI engine 102 checks the compatibility of the selected widget with the AOD and the AOT using the CNN classifier. If the selected widget can be determined as incompatible with the AOD and the AOT, the LPCI engine 102 displays an error due to incompatibility message to the user. Otherwise the LPCI engine 102 transforms the selected widget using the SOFM neural network and displays the transformed widget on the AOD.

Referring to FIG. 15B, an example diagram illustrates user control compatibility check performed using a launcher. Embodiments herein allow the user to click and hold desired widget to be transferred to the AOD. Further, the desired widget may be dragged across a launcher screen to an AOD transfer icon. Thereafter, the LPCI engine 102 may perform the compatibility check on the desired widget using the CNN classifier. If the desired widget can be determined as incompatible with the AOD and the AOT, the LPCI engine 102 displays an error due to incompatibility message to the user. Otherwise the LPCI engine 102 transforms the desired widget using the SOFM Neural network and displays the transformed widget on the AOD.

Referring to FIG. 15C, an example diagram illustrates a transition from the AOD mode to normal mode based on touch gestures. Embodiments herein allow the user to swipe on the AOD screen to go to a normal lock screen mode as illustrated in FIG. 15C. Based on the swipe gesture, the LPCI engine 102 performs the transition of the AOD to the normal lock screen mode.

Figure 16:
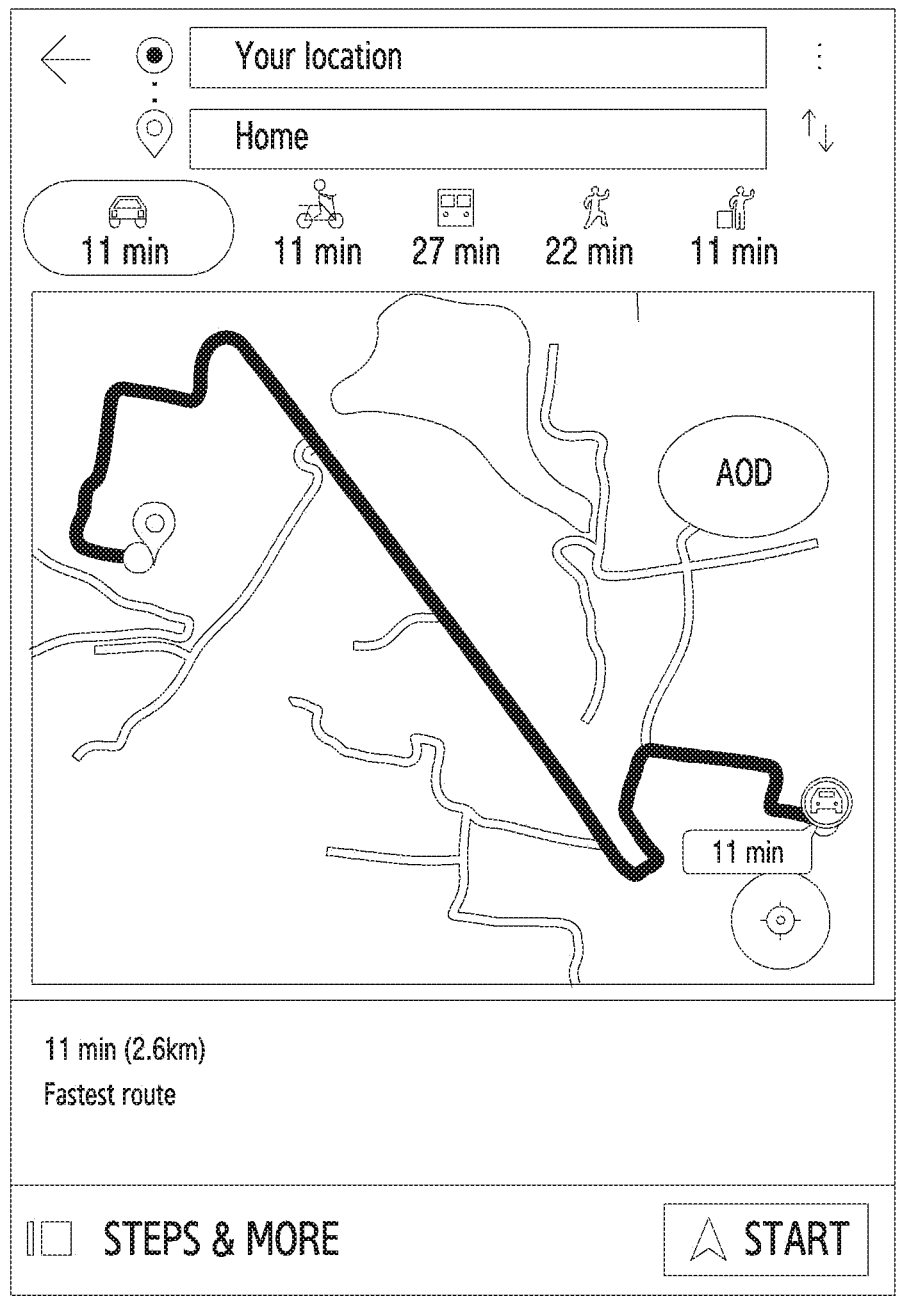
FIG. 16 is an example diagram illustrating an always on display (AOD) overlay user interface (UI) provided for transforming portion of content for a LPD according to an embodiment of the disclosure.

FIG. 16 is an example diagram illustrating an AOD overlay UI provided for transforming a portion of content for a LPD according to an embodiment of the disclosure.

Referring to FIG. 16, the LPCI engine 102 may display an AOD overlay UI button on the content. For example, the AOD overlay UI button may be displayed on navigation application as illustrated in FIG. 16. When the user clicks the AOD overlay UI button, the LPCI engine 102 may perform the compatibility check and transform a portion of the navigation application. Further, the LPCI engine 102 displays the transformed portion of the navigation application on the AOD screen.

Figure 17A:
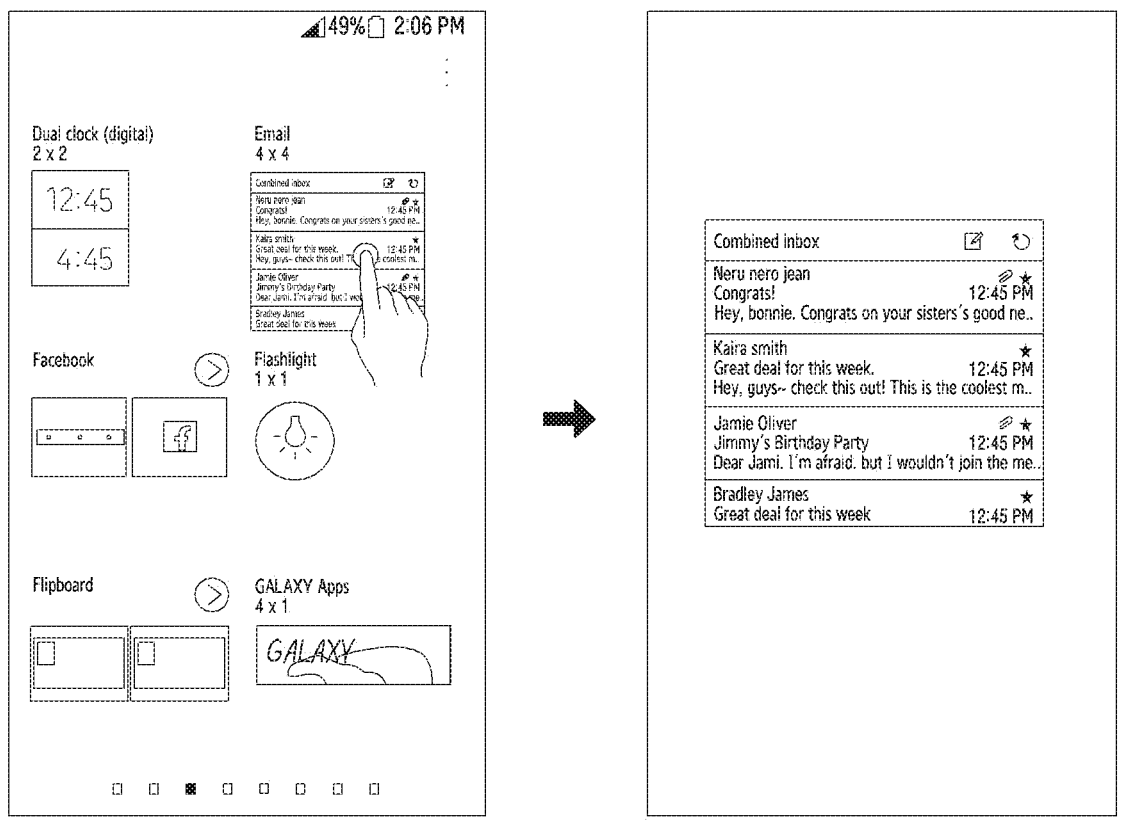
FIGS. 17A and 17B are example scenarios illustrating transfer of content on a LPD based on touch gestures according to various embodiments of the disclosure.
Figure 17B:
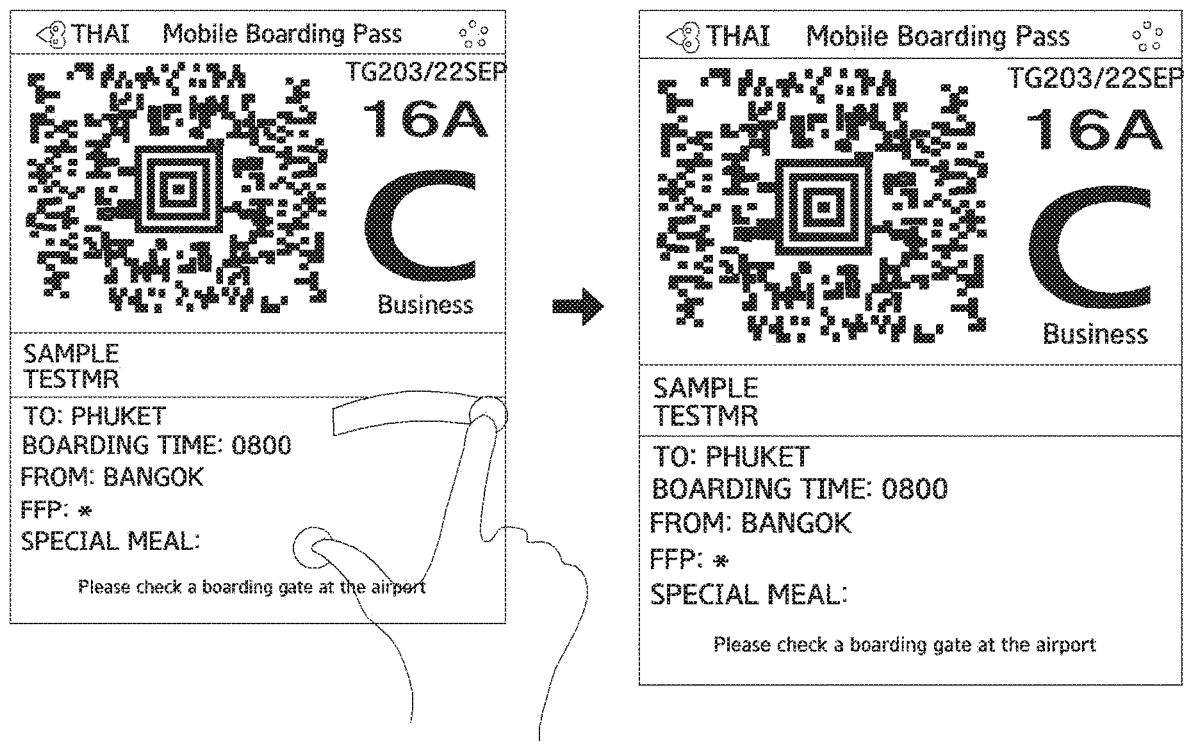

FIGS. 17A and 17B are example scenarios illustrating transfer of content on a LPD based on touch gestures according to various embodiments of the disclosure.

Referring to FIG. 17A, an example diagram illustrates transferring a widget to the LPD screen based on tap gestures. Embodiments herein enable any third party widget or control or content to be transferred to AOD via UI sequences or gestures. Embodiments herein enable application of UI transformations on the content to make the content compatible for the LPD 108. The user can perform a pre-determined gesture (for example, a tap gesture) to initiate the widget transfer to the AOD. The widget is transformed as per the AOD constraint and stays displayed.

Referring to FIG. 17B, an example diagram illustrates transfer of content to the LPD screen based on swipe gestures. For example, the user wants to display a boarding pass with a quick response (QR) code and ticket confirmation messages. The user can select the content on the device. Based on the swipe gesture performed by the user, the full boarding pass with adapted content can be displayed on the AOD.

Figure 18A:
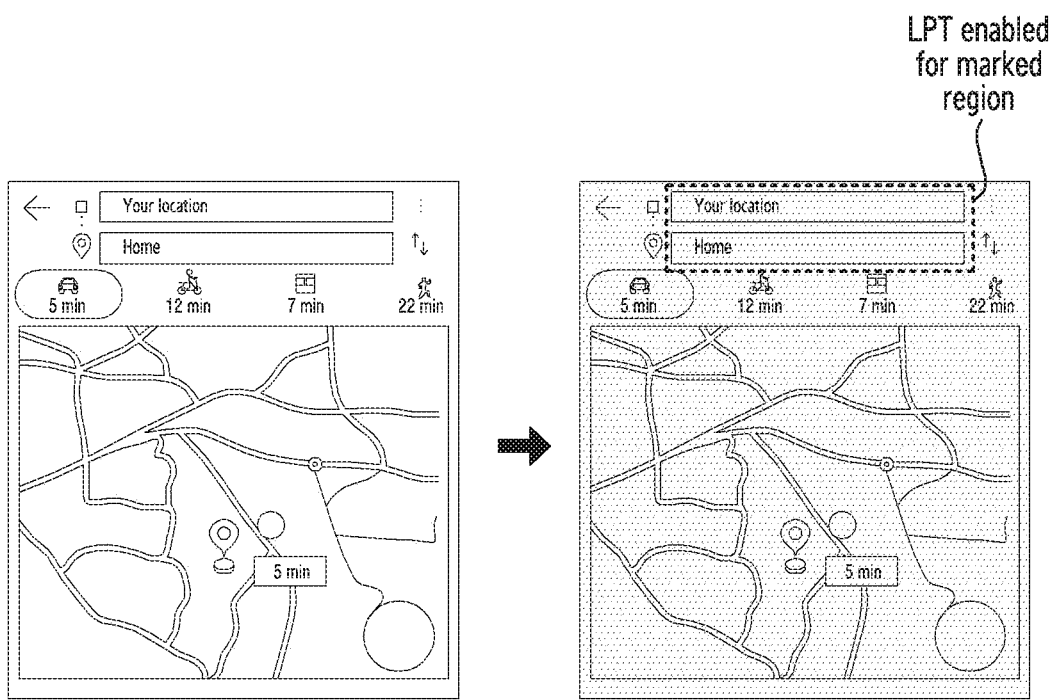
FIGS. 18A, 18B, and 18C are example diagrams illustrating compatibility check and transformation rules applied on content for displaying on a LPD according to various embodiments of the disclosure.
Figure 18B:
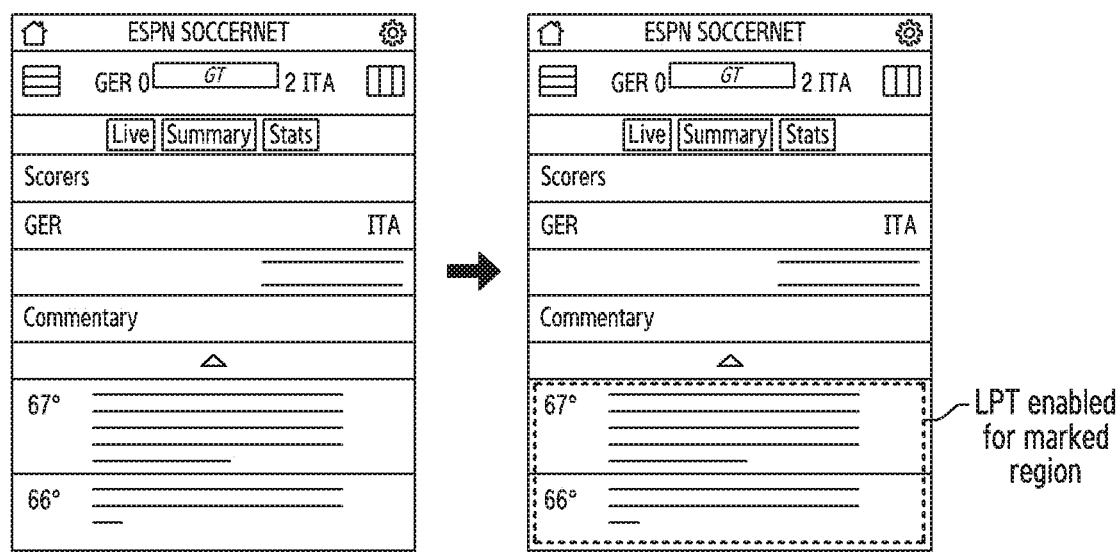
Figure 18C:
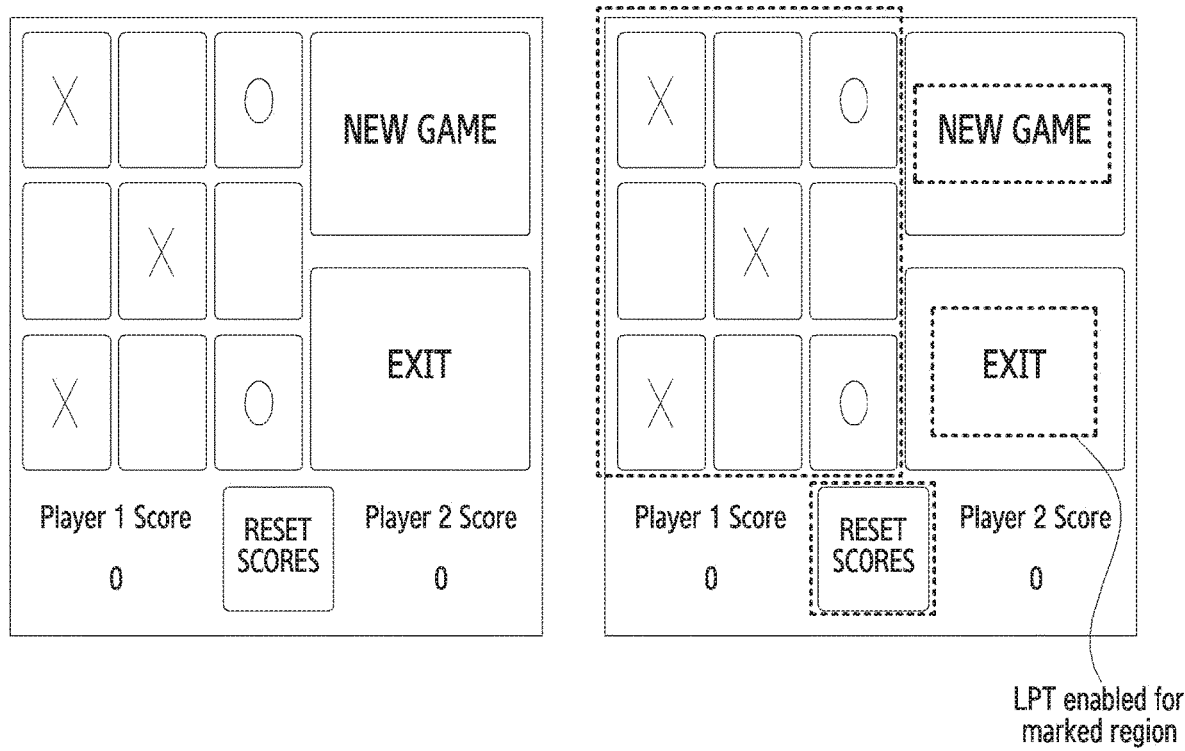

FIGS. 18A, 18B, and 18C are example diagrams illustrating compatibility check and transformation rules applied on content for displaying on a LPD according to embodiments as disclosed herein.

Referring to FIGS. 18A, 18B, and 18C, when receiving the content which needs to be displayed on the AOD with LPT enabled, the LPCI engine 102 checks whether the similar content is shared to the AOD earlier. For example, the content can be a map (as illustrated in FIG. 18A), a score and commentary board (as illustrated in FIG. 18B) and a gaming application (as illustrated in FIG. 18C). In response to determining that the content is already shared to the AOD, the LPCI engine 102 applies transformation rules on the content from the previous learning and displays the content on the AOD. Otherwise, the LPCI engine 102 performs compatibility check and records data with a content type.

For performing the compatibility check, the LPCI engine 102 analyzes the AOD and the AOT constraints. For example, in case of displaying the map (as illustrated in FIG. 18A), the considered AOD constraints may include a display that flickers and turns green due to a smaller on pixel ratio and a low power buck booster. Further, the image may not be visible in bright sunlight due to AOD brightness limitation and lower AOD color depth. The AOT constraints may include slow touch response due to limitation in touch refresh rate in the AOT and lack of map zoom option due to limited touch area in AOT.

Similarly, in case of displaying the score and commentary board and the gaming application (as illustrated in FIG. 18B and FIG. 18C), the considered AOD constraints may include a display that flickers and turns green due to smaller on pixel ratio and a low power buck booster. Further, the image may not be visible in bright sunlight due to AOD brightness limitation and lower AOD color depth. In addition, immediate score update may not be possible due to FPS limitations of AOD. The AOT constraints may include slow touch response due to limitation in touch refresh rate in the AOT.

After identifying the characteristics of the content and the AOD and the AOT constraints, the LPCI engine 102 compares the display characteristics of the content such as, white pixel density, color variance, SOFM and so on with a pre-defined threshold (related to the AOD constraints). In order to check for the compatibility of the content with the AOT, the LPCI engine 102 checks the touch input characteristics of the contents with a threshold defined in an AOT register.

After determining that the content can be compatible with the AOT and AOD, the LPCI engine 102 applies the transformation rules on the content based on the AOD and the AOT constraints. For example, in case of displaying the map and the gaming application, the LPCI engine 102 may perform actions such as, but not limited to, reducing the color of the map and the gaming application using local features and the SOFM neural network, applying color quantization, performing color enhancement depending on the ambient lighting, restricting FPS, enabling touch on individual input controls, or the like on the map and gaming application. Similarly, in case of displaying the score and commentary board, the LPCI engine 102 may perform actions such as, but not limited to, reducing the color of the map application using local features and the SOFM neural network, applying color quantization, performing color enhancement depending on the ambient lighting, restricting FPS or the like on the score and commentary board.

After applying the transformation rules on the content, the LPCI engine 102 analyzes performance and power consumption of the low power core used for displaying and updating the content on the AOD. The LPCI engine 102 determines factors such as, but not limited to, time taken for an image hash SOFM estimation and compatibility check, updates needed to be performed, and power consumption. For example, in case of displaying the map, the LPCI engine 102 determines that the time taken for the image hash SOFM estimation may be less than 2.3 ms and the time taken for compatibility check may be less than 10 ms. The LPCI engine 102 determines that the navigation pointer updates needed to be performed per second. Further, the LPCI engine 102 calculates power consumed in AOD may be less than 1.68 mA. Further based on the determined factors, the average increase in AOD power consumption can be determined as 2~3 mA per performance. Thus, based on the determined performance and power consumption, the LPCI engine 102 displays the transformed map application on the AOD with AOT enabled for a region of interest (marked region as illustrated in FIG. 18A).

Similarly in case of displaying the score and commentary board, the LPCI engine 102 determines that the time taken for image hash SOFM estimation may be less than 2.67 ms and the time taken for compatibility check may be less than 15 ms. The LPCI engine 102 determines that the commentary sections needed to be updated per second. Further, the LPCI engine 102 calculates that the power consumed in AOD may be less than 2.08 mA. Further based on the determined factors, the average increase in AOD power consumption can be determined as 2~3 mA per performance. Thus, based on the determined performance and power consumption, the LPCI engine 102 displays the score and commentary board on the AOD with AOT enabled for a region of interest (marked region as illustrated in FIG. 18B).

Further, in case of displaying the gaming application, the LPCI engine 102 determines that the time taken for the image hash SOFM estimation may be less than 1.43 ms and the time taken for compatibility check may be less than 5 ms. Further, the LPCI engine 102 calculates that the power consumed in AOD may be less than 1.03 mA. Further based on determined factors, the average increase in AOD power consumption can be determined as 1~2 mA per performance. Thus, based on the determined performance and power consumption, the LPCI engine 102 displays the gaming application on the AOD with AOT enabled for a region of interest (marked region as illustrated in FIG. 18C).

The embodiments disclosed herein can be implemented through at least one software program running on at least one hardware device and performing network management functions to control the elements. The elements shown in FIG. 1 and FIG. 2 can be at least one of a hardware device, or a combination of hardware device and software module.

While the disclosure has been shown and described with reference to various embodiments thereof, it will be understood by those skilled in the art will that various changes in form and details may be made therein without departing from the spirit and scope of the disclosure as defined by the appended claims and their equivalents.

What is claimed is:

1. A method for displaying content on an electronic device that supports at least one low power display mode, the method comprising:

identifying at least one characteristic of content to be displayed on a low power display (LPD) of the electronic device;

determining compatibility of at least one portion of the content with the LPD based on the at least one characteristic of the content;

transforming the at least one portion of the content on the LPD when the at least one portion of the content is not compatible with the LPD; and displaying the transformed at least one portion of the content on the LPD.

2. The method of claim 1,
wherein the at least one characteristic of the content includes at least one of a touch input characteristic or a display characteristic, and
wherein the display characteristic includes at least one of histogram information, color depth, or pixel power.

3. The method of claim 1, wherein the determining of the compatibility of the at least one portion of the content comprises:
obtaining at least one constraint of the LPD;
determining a correlation of the at least one characteristic of the content with respect to the at least one constraint of the LPD; and
determining the compatibility of the at least one portion of the content with the LPD based on the correlation.

4. The method of claim 3, wherein the compatibility is determined using a convolutional neural network (CNN) classifier.

5. The method of claim 1, wherein the transforming and displaying of the at least one portion of the content on the LPD comprises:
when the at least one portion of the content is compatible with the LPD, placing the at least one portion of the content on the LPD without transforming the at least one portion of the content; and
when the at least one portion is not compatible with the LPD, placing the at least one portion of the content for on the LPD by applying transformation rules on the at least one portion of the content within a threshold and recommending a modified version of the at least one portion of the content.

6. The method of claim 5, wherein the transformation rules are applied on the at least one portion of the content using a self- organizing feature map (SOFM) neural network.

7. The method of claim 5, wherein the modified version of the at least one portion of the content is recommended based on context including at least one of a location, policy derived data analytics, and features learned using a machine learning model.

8. The method of claim 1, further comprising:
determining a suitable location on the LPD for displaying the at least one portion of the content, wherein the suitable location is determined using contextual information of the electronic device; and
configuring at least one setting for the LPD for the displaying of the at least one portion of the content on the LPD,
wherein the at least one setting is configured based on at least one operational requirement of the content.

9. The method of claim 1, further comprising:
identifying the content to be displayed on the LPD;
checking availability of at least one pre-learned portion of the content; and
before displaying of the at least one portion of the content, performing at least one action on the at least one portion of the content based on at least one setting applied to the at least one pre-learned portion of the content.

10. The method of claim 1, further comprising:
identifying another content to be displayed on the LPD while a low power touch (LPT) is enabled;
determining at least one characteristic of the other content, wherein the at least one characteristic of the other content includes at least one of at least one display characteristic or at least one touch characteristic;
determining compatibility of at least one portion of the other content with the LPD and LPT based on the at least one characteristic of the other content; and
performing at least one action on the at least one portion of the other content and displaying the at least one portion of the other content on the LPD, wherein the at least one action is performed based on results of the compatibility check.

11. An electronic device that supports at least one low power mode setting, the electronic device comprises:
at least one processor configured to:
identify at least one characteristic of content to be displayed on a low power display (LPD) of the electronic device,
determine compatibility of at least one portion of the content with the LPD based on the at least one characteristic of the content,
transform the at least one portion of the content if the at least one portion of the content is not compatible with the LPD, and
control the LPD to display the transformed at least one portion of the content on the LPD.

12. The electronic device of claim 11,
wherein the at least one characteristic of the content includes at least one of a touch input characteristic or a display characteristic, and
wherein the display characteristics includes at least one of histogram information, color depth, or pixel.

13. The electronic device of claim 11, wherein the at least one processor is further configured to:
obtain at least one constraint of the LPD;
determine a correlation of the at least one characteristic of the content with respect to the at least one constraint of the LPD; and
determine the compatibility of the at least one portion of the content with the LPD based on the correlation.

14. The electronic device of claim 13, wherein the compatibility is determined using a convolutional neural network (CNN) classifier.

15. The electronic device of claim 11, wherein, when the at least one processor transforms and controls the LPD to display the at least one portion of the content based on whether the at least one portion of the content is compatible with the LPD, the at least one processor is further configured to:
when the at least one portion of the content is compatible with the LPD, place the at least one portion of the content on the LPD without transforming the at least one portion of the content; and
when the at least one portion is not compatible with the LPD, place the at least one portion of the content for on the LPD by applying transformation rules on the at least one portion of the content within a threshold and recommend a modified version of the at least one portion of the content.

16. The electronic device of claim 15, wherein the transformation rules are applied on the at least one portion of the content using a self- organizing feature map (SOFM) neural network.

17. The electronic device of claim 15, wherein the modified version of the at least one content is recommended based on context including at least one of location, policy derived data analytics and features learned using a machine learning model.

18. The electronic device of claim 11, wherein the at least one processor is further configured to:
- determine a suitable location on the LPD for displaying the at least one portion of the content, wherein the suitable location is determined using contextual information of the electronic device; and
- configure at least one setting for the LPD for the displaying of the at least one portion of the content on the LPD, wherein the at least one setting is configured based on at least one operational requirement of the content.

19. The electronic device of claim 11, wherein the at least one processor is further configured to:
- identify the content to be displayed on the LPD;
- check availability of at least one pre-learned portion of the content; and
- before the at least one portion of the content is displayed, perform at least one action on the at least one portion of the content based on at least one setting applied to the at least one pre-learned portion of the content.

20. An electronic device that supports at least one low power mode setting, the electronic device comprises:
- at least one processor configured to:
  - identify content to be displayed on a low power display (LPD) of the electronic device with a low power touch (LPT) enabled;
  - determine at least one characteristic of the content, wherein the at least one characteristic includes at least one of at least one display characteristic or at least one touch characteristic;
  - determine compatibility of at least one portion of the content with the LPD and LPT based on the at least one characteristic of the content; and
  - perform at least one action on the at least one portion of the content based on results of the compatibility check; and
- after the at least one action is performed, displaying the at least one portion of the content on the LPD with LPT enabled.

* * * * *